US009210346B2

(12) United States Patent
Ichimiya

(10) Patent No.: US 9,210,346 B2
(45) Date of Patent: Dec. 8, 2015

(54) FOCUS DETECTION SENSOR AND OPTICAL APPARATUS USING THE SAME

(71) Applicant: CANON KABUSHIKI KAISHA, Tokyo (JP)

(72) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/657,277

(22) Filed: Mar. 13, 2015

(65) Prior Publication Data
US 2015/0189206 A1 Jul. 2, 2015

Related U.S. Application Data

(63) Continuation of application No. 13/558,879, filed on Jul. 26, 2012, now Pat. No. 9,025,069.

(30) Foreign Application Priority Data

Aug. 9, 2011 (JP) .................................. 2011-174251
Dec. 12, 2011 (JP) .................................. 2011-271690

(51) Int. Cl.
*H04N 5/232* (2006.01)
*G03B 13/00* (2006.01)
*H04N 5/369* (2011.01)
(Continued)

(52) U.S. Cl.
CPC ................ *H04N 5/3696* (2013.01); *G02B 7/38* (2013.01); *G03B 13/36* (2013.01); *H04N 5/23212* (2013.01)

(58) Field of Classification Search
CPC .................................................. H04N 5/23212
USPC .................................... 348/345, 349; 396/96
See application file for complete search history.

(56) References Cited

U.S. PATENT DOCUMENTS 7,263,212 B2    8/2007   Kawabe
8,063,977 B2    11/2011  Nakagawa
(Continued)

FOREIGN PATENT DOCUMENTS

CN    1495673 A       5/2004
JP    H01-288820 A    11/1989
(Continued)

OTHER PUBLICATIONS

Office Action dated May 5, 2014, in Chinese Patent Application No. 201210283241.2.
(Continued)

*Primary Examiner* — Joel Fosselman
(74) *Attorney, Agent, or Firm* — Fitzpatrick, Cella, Harper & Scinto

(57) ABSTRACT

A focus detection sensor includes a line sensor comprised of a pair of sensor arrays in which a plurality of pixels are arranged. The sensor arrays include a pixel of a first type having an arrangement for transferring charges generated by a photoelectric conversion device to a corresponding memory device and causing the memory device to integrate the charges during a charge accumulation period, and a pixel of a second type having an arrangement for integrating, in the pixel, the charges generated by the photoelectric conversion device during the charge accumulation period without transferring the charges to the memory device until the end of the charge accumulation period, and transferring the charges to the corresponding memory device when the charge accumulation period has ended. An accurate charge accumulation result can be obtained by a simple arrangement.

7 Claims, 16 Drawing Sheets

(51) Int. Cl.
  *G02B 7/38* (2006.01)
  *G03B 13/36* (2006.01)

(56) References Cited

U.S. PATENT DOCUMENTS

2005/0231628 A1  10/2005  Kawaguchi et al.
2010/0328521 A1  12/2010  Sato
2011/0134272 A1   6/2011  Kinugasa

FOREIGN PATENT DOCUMENTS

JP   10-333021 A   12/1998
JP   2006-251777 A  9/2006
JP   2008-129067 A  6/2008

OTHER PUBLICATIONS

Office Action dated Aug. 31, 2015, in Japanese Application No. 2011-271690.

FOCUS DETECTION SENSOR AND OPTICAL APPARATUS USING THE SAME

This is a continuation of U.S. patent application Ser. No. 13/558,879, filed Jul. 26, 2012.

BACKGROUND OF THE INVENTION

1. Field of the Invention

The present invention relates to a focus detection sensor to be used for automatic focus detection and an optical apparatus using the focus detection sensor.

2. Description of the Related Art

There is conventionally known, for example, an image capture apparatus having an auto focus (to be referred to as AF hereinafter) function of adjusting the in-focus distance of an imaging lens in accordance with the focus detection state of a subject detected by a focus detection sensor, including a photoelectric conversion device, and automatically focusing on the subject. Also known is controlling the charge accumulation time or the output gain of the photoelectric conversion device of the focus detection sensor based on the brightness or contrast of a subject.

For example, in Japanese Patent Laid-Open No. 2006-251777, a focus detection sensor uses line sensors each comprised of a plurality of photoelectric conversion devices (pixels). Each line sensor is divided into a plurality of areas, and accumulation is stopped in each area when the difference (contrast) between the maximum value and the minimum value of pixel signals has exceeded a target value.

In addition, Japanese Patent Laid-Open No. 10-333021 discloses arranging a monitor sensor near a line sensor pair used for focus detection and controlling the accumulation (integration) time of the line sensor pair based on the signal from the monitor sensor.

In the arrangement disclosed in Japanese Patent Laid-Open No. 2006-251777, however, since charges photoelectrically converted by the pixels are always transferred to the accumulation circuit, noise generated in the accumulation circuit during accumulation is also accumulated, like the photoelectrically converted charges. When the accumulation time is long, the amount of generated noise also increases. For this reason, the influence of noise components in the accumulation result is not negligible, and may lead to an error in the focus detection result.

On the other hand, in the arrangement disclosed in Japanese Patent Laid-Open No. 10-333021, since accumulation control is done based on the output of the monitor sensor provided separately from the line sensors, charges photoelectrically converted by the pixels need not be transferred to a memory circuit or a monitor circuit. Hence, generated noise can be reduced by resetting the memory circuit or the monitor circuit until the end of accumulation in the pixels.

In the arrangement of Japanese Patent Laid-Open No. 10-333021, however, it is necessary to arrange the monitor sensor near the line sensors. In addition, the monitor sensor needs to perform accurate photometry to appropriately control the accumulation. When a plurality of line sensors are arranged, the monitor sensor restricts the layout of the line sensors. To accurately perform photometry, the arrangement of the monitor sensor itself is also restricted. As a result, the chip area of the focus detection sensor may become larger to increase the cost or impede downsizing of an optical apparatus using the focus detection sensor.

SUMMARY OF THE INVENTION

The present invention has been made in consideration of the problems of the related arts.

According to an aspect, the present invention provides a focus detection sensor capable of obtaining an accurate charge accumulation result by a simple arrangement. According to another aspect, the present invention provides an optical apparatus that performs automatic focus detection using the focus detection sensor according to the present invention.

The first aspect of the present invention provides a focus detection sensor comprising a line sensor comprised of a pair of sensor arrays, the sensor array comprising a plurality of pixels arranged in a line and each of the plurality of pixels including a photoelectric conversion device, wherein the plurality of pixels arranged in the pair of sensor arrays include: a pixel of a first type having an arrangement for transferring charges generated by the photoelectric conversion device to a corresponding memory device and causing the memory device to integrate the charges during a charge accumulation period; and a pixel of a second type having an arrangement for integrating, in the pixel, the charges generated by the photoelectric conversion device during the charge accumulation period without transferring the charges to the memory device until an end of the charge accumulation period, and transferring the charges to the corresponding memory device when the charge accumulation period has ended, and the focus detection sensor further comprises: a detection unit configured to detect that an integrated value in the memory device of the pixel of the first type has reached a predetermined value; and a control unit configured to control an operation of the line sensor, wherein the control unit ends the charge accumulation period and causes the charges integrated by the pixel of the second type to be transferred to the corresponding memory device when the detection unit detects that the integrated value in the memory device of the pixel of the first type has reached the predetermined value after a start of the charge accumulation period in the sensor array.

The second aspect of the present invention provides a focus detection sensor comprising: a line sensor comprised of a pair of sensor arrays, the sensor array comprising a plurality of pixels arranged in a line and each of the plurality of pixels including a photoelectric conversion device; and a control unit configured to control an operation of the line sensor, the focus detection sensor further comprising: a measurement unit configured to measure a subject luminance; and a setting unit configured to set an operation type of the line sensor, wherein: the setting unit sets the operation type of the line sensor to a first type when the subject luminance measured by the measurement unit is not more than a predetermined threshold, and sets the operation type of the line sensor to a second type when the subject luminance measured by the measurement unit is more than the predetermined threshold, and the control unit controls to cause each of the plurality of pixels arranged in the sensor arrays to operate as a pixel of the first type having an arrangement for transferring charges generated by the photoelectric conversion device to a corresponding memory device and causing the memory device to integrate the charges during a charge accumulation period when the operation type of the line sensor is set to the first type, and controls to cause each of the plurality of pixels arranged in the sensor arrays to operate as a pixel of the second type having an arrangement for integrating, in the pixel, the charges generated by the photoelectric conversion device during the charge accumulation period without transferring the charges to the corresponding memory device until an end of the charge accumulation period, and transferring the charges to the corresponding memory device when the charge accumulation period has ended when the operation type of the line sensor is set to the second type.

The third aspect of the present invention provides an optical apparatus comprising: a focus detection sensor of the first and second aspects of the present invention which is arranged to receive a light beam incident from an imaging lens; a calculation unit configured to calculate a defocus amount of the imaging lens from an image signal generated by reading a signal from a memory device of a pixel of a first type and an image signal generated by reading a signal from a memory device of a pixel of a second type of a line sensor that has ended a charge accumulation period; and a lens driving unit configured to drive the imaging lens based on the defocus amount.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 2:
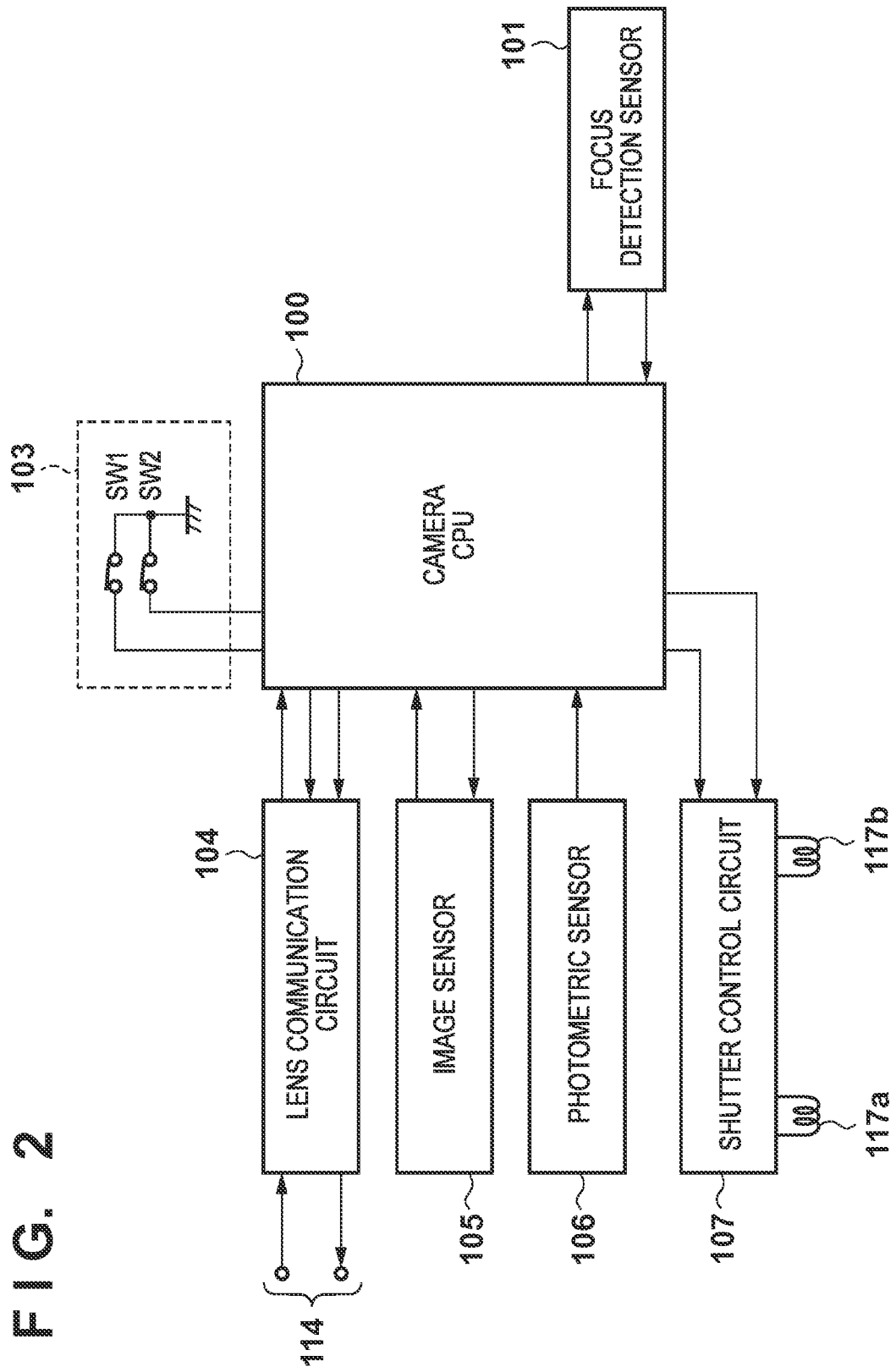
FIG. 2 is a block diagram showing an example of the arrangement of a camera as an example of an optical apparatus using the focus detection sensor according to the embodiment of the present invention.

FIG. 2 is a block diagram showing an example of the arrangement of a camera as an example of an optical apparatus using a focus detection sensor according to an embodiment of the present invention. Note that FIG. 2 does not illustrate camera components except those concerning automatic focus detection.

A switch 103 includes two switches SW1 and SW2 that are on/off-controlled by operating a release button (not shown). The switch SW1 is turned on by the first stroke (half stroke) operation of the release button. The switch SW2 is turned on by the second stroke (full stroke) operation of the release button. Turning on the switch SW1 corresponds to an instruction to start an image capture preparation operation including a focus detection operation. Turning on the switch SW2 corresponds to an instruction to start an image capture operation.

A lens communication circuit 104 sends/receives a lens signal 114 to/from an imaging lens (not shown) under the control of a camera CPU 100 so as to control the focusing lens of the imaging lens or the stop of the imaging lens.

A shutter control circuit 107 controls the energized period of electromagnets 117a and 117b provided in a shutter mechanism (not shown) under the control of the camera CPU 100, thereby controlling open/close of the shutter.

The camera CPU 100 includes a ROM that stores programs, a RAM to store variables, and an EEPROM (Electrically Erasable and Programmable ROM) to store various parameters. The camera CPU 100 controls the respective units based on the programs, thereby controlling the overall operation of the camera.

When the switch SW2 is turned on, the camera CPU 100 detects the luminance of a subject by controlling a photometric sensor 106, and decides image capture conditions such as the f-number of the imaging lens (not shown) and the shutter speed based on the subject luminance. The camera CPU 100 communicates with the lens communication circuit 104 and the shutter control circuit 107 to expose an image sensor 105 under the decided image capture conditions. The camera CPU 100 executes a series of image capture operations of reading charges accumulated in the image sensor 105, applying known image processing to generate captured image data, and recording the image data in a recording medium (not shown).

(Arrangement of Optical System Parts of Camera)

Figure 3:
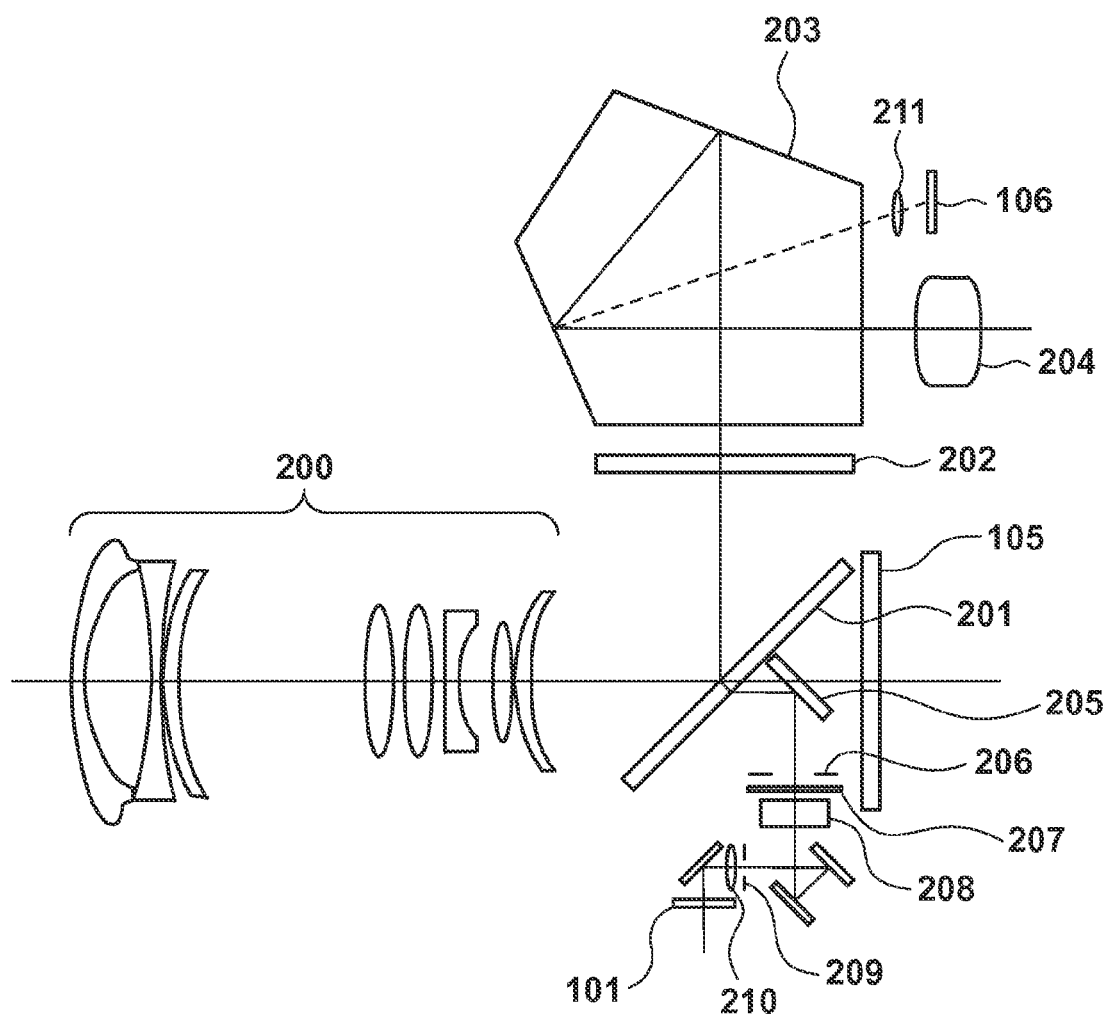
FIG. 3 is a view showing optical parts included in the camera according to the first embodiment of the present invention and an example of the arrangement thereof.

FIG. 3 is a view showing optical parts included in the camera according to this embodiment and an example of the arrangement thereof. FIG. 3 illustrates an example of the arrangement of the optical parts viewed from a side of the camera. Note that the camera includes an imaging lens 200 in FIG. 3. The imaging lens 200 can be detachable, and is not indispensable in the camera.

Most components of a light beam entering from the subject via the imaging lens 200 are reflected upward by a quick return mirror 201 to form an image on a viewfinder screen 202. The operator observes, via a pentaprism 203 and an eyepiece lens 204, the subject image formed on the viewfinder screen 202. A photometric imaging lens 211 and the photometric sensor 106 are provided above the eyepiece lens 204. The photometric sensor 106 can measure the subject luminance by receiving, via the photometric imaging lens 211, the subject image formed on the viewfinder screen 202. Note that the combination and arrangement of the photometric imaging lens 211 and the photometric sensor 106 in FIG. 3 are merely examples and may be different from those in FIG. 3 as far as the subject luminance can be measured.

Some components of the light beam entering via the imaging lens 200 are transmitted through the quick return mirror 201 and guided, by a sub-mirror 205 on the rear side, to a focus detection optical system located below. The light beam that has entered the focus detection optical system passes through a field-of-view mask 206, an infrared cut filter 207, a field lens 208, a stop 209, and a second imaging lens 210 and forms an image on a focus detection sensor 101. The focus state (defocus amount) of the imaging lens 200 can be detected based on the phase difference between image signals obtained by causing the focus detection sensor 101 to photoelectrically convert the formed image.

When the switch SW2 is turned on to perform the image capture operation, the quick return mirror 201 rotates upward and retracts from the optical path, and the shutter opens so that the image sensor 105 is exposed to the light beam of the subject image incident from the imaging lens 200.

(Arrangement of Focus Detection Optical System)

Figure 4:
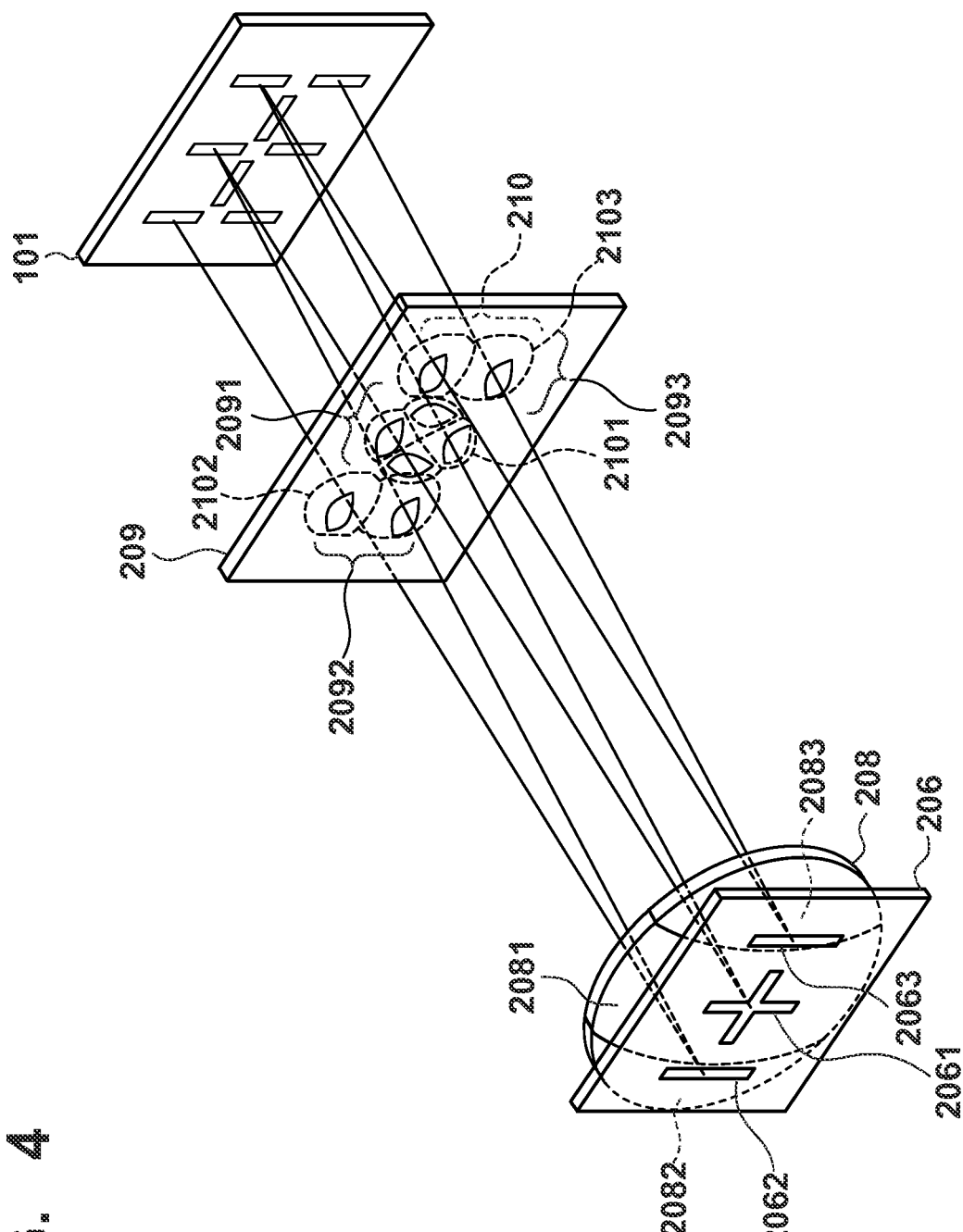
FIG. 4 is a perspective view schematically showing the arrangement of a focus detection optical system provided in the camera according to the first embodiment of the present invention.

FIG. 4 is a perspective view schematically showing the arrangement of the focus detection optical system provided in the camera according to this embodiment. Note that FIG. 4 illustrates an arrangement excluding the mirrors and the infrared cut filter 207 of the focus detection optical system shown in FIG. 3 for easy description and understanding.

The light beam of the subject image reflected by the sub-mirror 205 temporarily forms an image near the field-of-view mask 206. The field-of-view mask 206 is a light shielding member configured to decide a focus detection area (distance measurement point) in the field of view (screen). The field-of-view mask 206 has a cruciform opening portion 2061 arranged at the center, and opening portions 2062 and 2063 that are long in the vertical direction and arranged on the left and right sides of the opening portion 2061.

Three lenses 2081 to 2083 constructing the field lens 208 correspond to the three opening portions 2061 to 2063 of the field-of-view mask 206, respectively. The stop 209 is arranged behind the field lens 208. The stop 209 includes four opening portions 2091 provided at the center in correspondence with the opening portion 2061 of the field-of-view mask 206, and opening portions 2092 and 2093 provided on the left and right sides of the opening portions 2091 in correspondence with the opening portions 2062 and 2063, respectively.

The field lens 208 has an effect of forming the images of the opening portions 2091 to 2093 of the stop 209 near the exit pupil of the imaging lens 200. The second imaging lens 210 is arranged behind the stop 209. The second imaging lens 210 is comprised of eight lenses 2101 to 2103 provided at positions corresponding to the opening portions 2091 to 2093 of the stop 209.

The light beams that have passed through the field-of-view mask 206, the field lens 208, the stop 209, and the second imaging lens 210 form images on a plurality of line sensors included in the focus detection sensor 101.

(Positional Relationship Between Distance Measurement Points and Arrangement of Line Sensors)

Figure 5A:
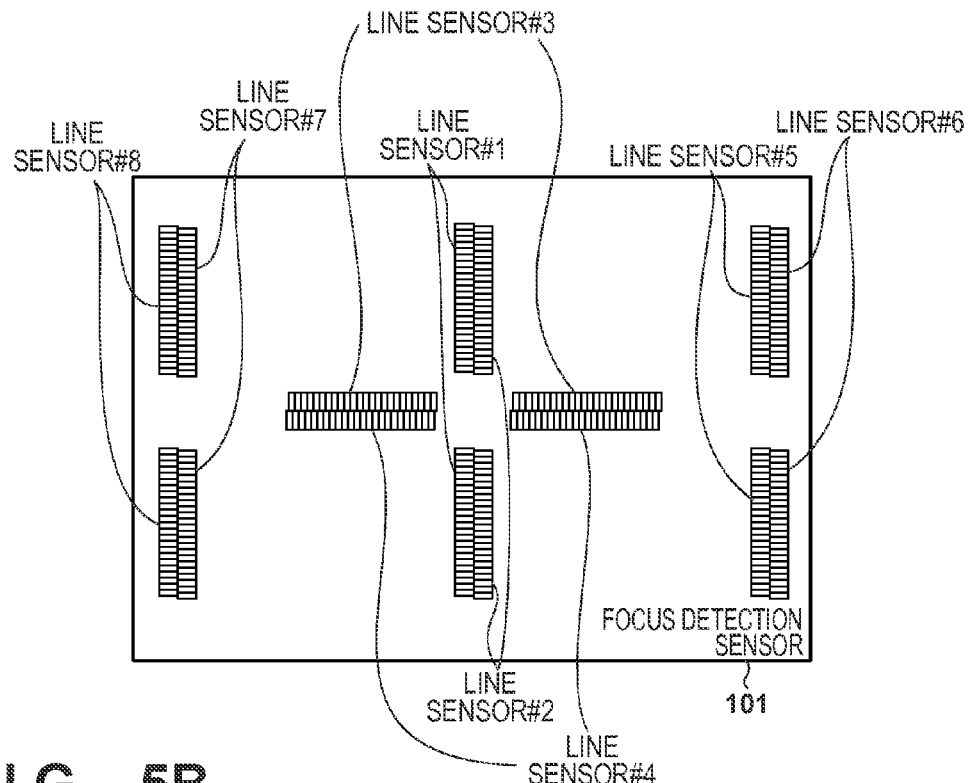
FIG. 5A is a view showing an example of the arrangement of line sensors in the focus detection sensor according to the first embodiment of the present invention.

The positional relationship between the line sensors and distance measurement points in the screen will be described in more detail with reference to FIGS. 5A and 5B. FIG. 5A is a view showing an example of the arrangement of the line sensors in the focus detection sensor 101. Each of line sensors #1 to #8 is comprised of a pair of sensor arrays. Each sensor array has a structure in which a plurality of pixels serving as sensors are arranged in a line, and can obtain a signal image from the outputs of the pixels. The focus state (defocus amount) of the imaging lens can be detected from the phase difference between image signals obtained from each pair of sensor arrays. Each pair of sensor arrays are projected on almost the same area on the field of view (screen) via the focus detection optical system including the second imaging lens 210 and the like. This area forms a distance measurement point.

Figure 5B:
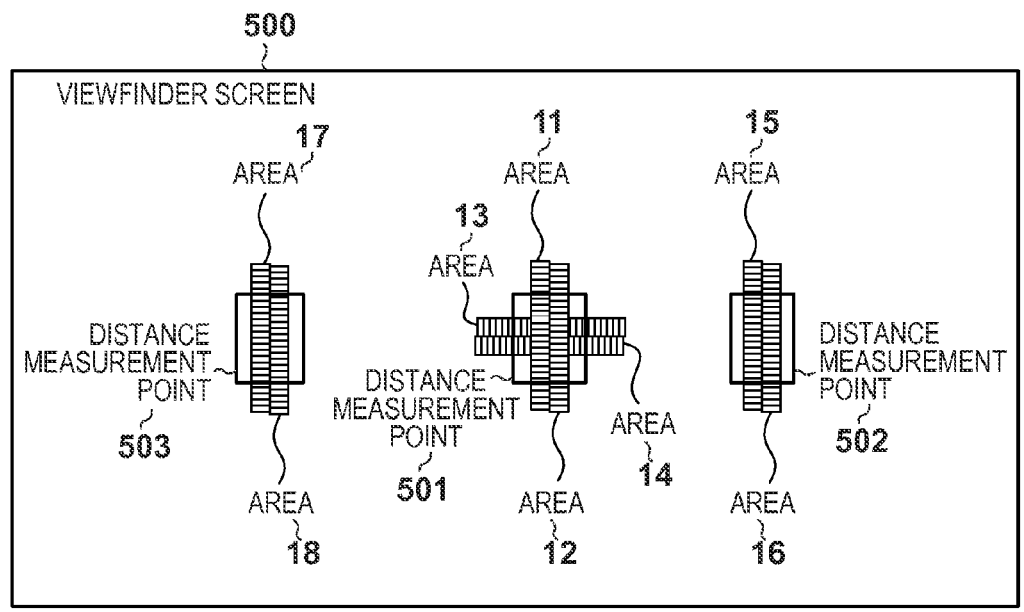
FIG. 5B is a view showing an example of the positional relationship between the line sensors and distance measurement points on a viewfinder screen corresponding to the focus detection sensor shown in FIG. 5A.

FIG. 5B is a view showing an example of the positional relationship between the line sensors and the distance measurement points on the viewfinder screen corresponding to the focus detection sensor 101 shown in FIG. 5A.

A total of three distance measurement points, that is, a distance measurement point 503 corresponding to line sensors #7 and #8, a distance measurement point 501 corresponding to line sensors #1 to #4, and a distance measurement point 502 corresponding to line sensors #5 and #6 exist on a viewfinder screen 500 (field of view).

The distance measurement point 501 at the center includes area #11 to project line sensor #1, area #12 to project line sensor #2, area #13 to project line sensor #3, and area #14 to project line sensor #4. The distance measurement point 501 includes areas #11 and #12 in the vertical direction, and areas #13 and #14 in the horizontal direction. For this reason, at the distance measurement point 501, the focus state of the imaging lens can be detected from both the vertical contrast image and the horizontal contrast image of the subject image. The defocus amount can be decided based on the average value of the focus state obtained in areas #11 and #12 in the vertical direction and the focus state obtained in areas #13 and #14 in the horizontal direction. Alternatively, the defocus amount may be decided using a signal image having a higher contrast out of the signal images obtained in the vertical areas and the horizontal areas because in general, the higher the contrast is, the higher the detection accuracy is.

In this embodiment, the adjacent sensor arrays are arranged while being shifted by a ½ pitch, as shown in FIGS. 5A and 5B. Hence, areas #11 and #12 at the projection positions of line sensors #1 and #2 are not only shifted in the horizontal direction but also slightly shifted in the vertical direction. Generally, when the spatial frequency of the subject is high, the detected defocus amount contains an error because of the relationship between the pixel positions of the sensor arrays and the phase of the subject contrast. To reduce the error, the average value of two defocus amounts obtained by two pairs of sensor arrays shifted by the ½ pitch is used. This also applies to the remaining areas.

(Arrangement of Focus Detection Sensor)

Figure 1:
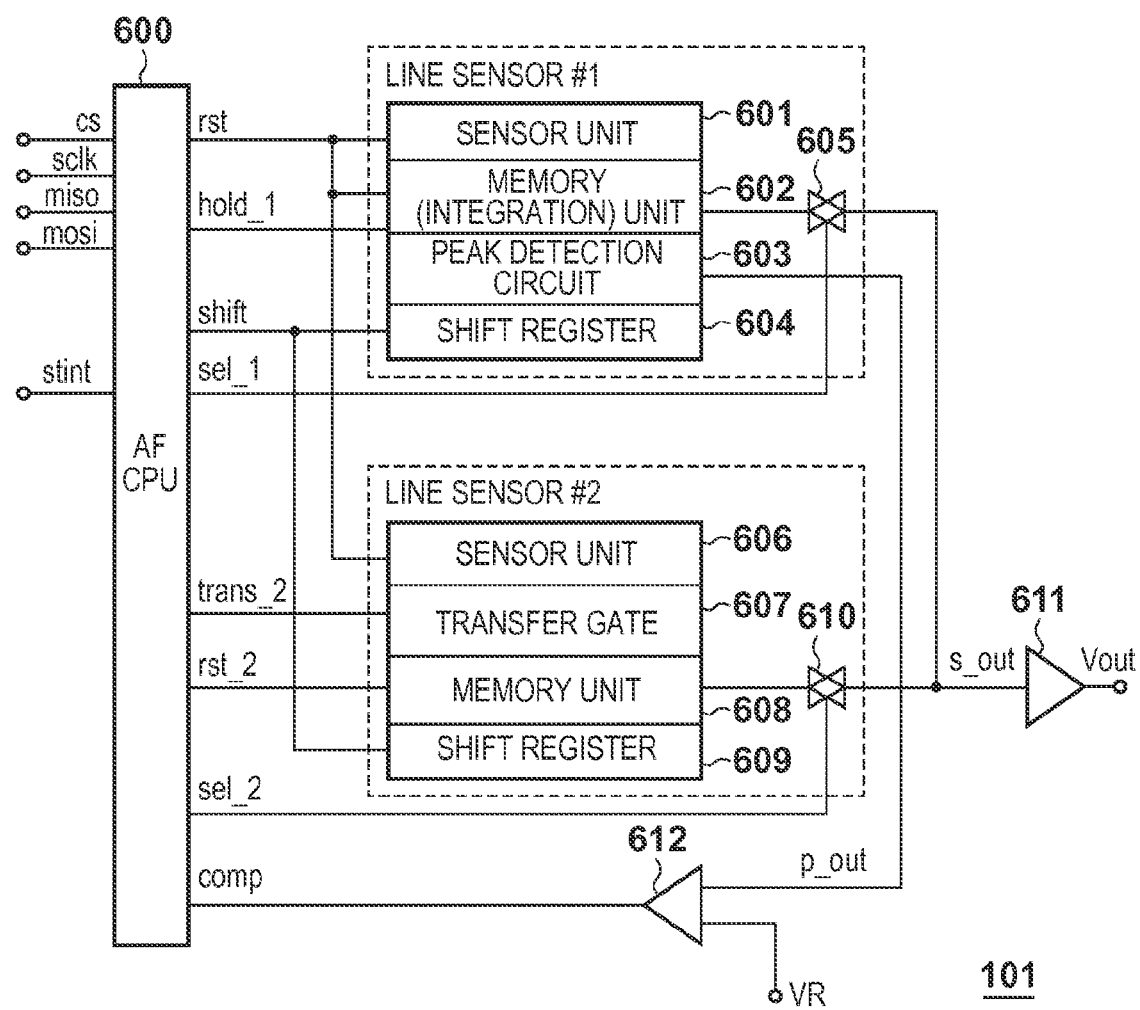
FIG. 1 is a block diagram showing an example of the electrical arrangement of a focus detection sensor according to the first embodiment of the present invention.

FIG. 1 is a block diagram showing an example of the electrical arrangement of the focus detection sensor 101 according to this embodiment.

FIG. 1 illustrates only a set of line sensors #1 and #2 arranged adjacently at almost the same position out of line sensors #1 to #8 shown in FIGS. 5A and 5B for easy description and understanding. The connection also applies to the remaining sets of line sensors (#3 and #4, #5 and #6, and #7 and #8) similarly arranged adjacently.

The focus detection sensor 101 includes an automatic focus detection CPU (AF CPU) 600. The AF CPU 600 controls the accumulation operation and image signal read operation of each sensor array. Line sensor #1 includes a pair of sensor arrays for phase difference detection. The pair of sensor arrays detect a first image and a second image, respectively, from the outputs of equal numbers of (for example, about 30 to 80) pixels.

In line sensor #1, a sensor unit 601 corresponds to the photoelectric conversion device of the pair of sensor arrays. A memory unit 602 integrates signal charges photoelectrically converted by each pixel of the sensor unit 601 and temporarily stores the signal charges on the pixel basis. A peak detection circuit 603 detects the largest value out of the integrated values stored in the memory unit 602. A shift register 604 selects a pixel to read the integrated value from the memory unit 602.

Signal charges photoelectrically converted by the pixels of the sensor unit 601 are transferred during the charge accumulation period and integrated by the memory unit 602. The memory unit 602 includes a capacitor and an amplifier (neither are shown) so as to convert the integrated signal charges into a voltage and amplify the voltage by a predetermined gain on the pixel basis. In addition, the memory unit 602 temporarily stores the integrated signal charges at the same time as the end of the accumulation operation of the sensor unit 601.

The peak detection circuit 603 outputs, to the input portion of a comparator 612, the largest one (p-out) of the pixel-basis voltage values in the memory unit 602.

As described above, line sensor #1 includes a sensor array that causes the sensor unit 601 to transfer charges during the charge accumulation period, the memory unit 602 to integrate them on the pixel basis, and the peak detection circuit 603 to detect the maximum integrated value. In this specification, such a sensor array will be referred to as a sensor array of a first type, and a line sensor comprised of sensor arrays of the first type will be referred to as a line sensor of the first type. Hence, all of line sensors #1, #3, #5, and #7 are line sensors of the first type.

The comparator 612 compares the signal p-out with a reference voltage VR having a predetermined value, and outputs a signal comp representing the comparison result to the AF CPU 600. The signal comp is 1 when p-out>VR, and 0 otherwise. Note that the reference voltage VR having the predetermined value is a pixel saturation voltage and is set to a value representing that the accumulation operation should end when p-out>VR.

Upon receiving a signal shift input from the AF CPU 600, the shift register 604 selects the output of the memory unit 602 on the pixel basis, and sequentially outputs the output of the memory unit 602 to the input of an output amplifier 611 during the time an analog switch 605 is turned on by a signal sel_1. The output amplifier 611 outputs a pixel signal Vout from the terminal Vout by an appropriate gain.

Line sensor #2 detects a first image and a second image from pixels as many as those of line sensor #1.

Line sensor #2 includes a sensor unit 606 corresponding to the sensor unit 601 and the memory unit 602 of line sensor #1, a transfer gate 607, a memory unit 608 that reads and stores signal charges integrated by the sensor unit 606, and a shift register 609.

The sensor unit 606 integrates signal charges photoelectrically converted by each pixel on the pixel basis. The transfer gate 607 controls transfer of the signal charges integrated by the sensor unit 606 to the memory unit 608. When the transfer gate 607 is on, the signal charges integrated by the sensor unit 606 are transferred to the memory unit 608. When the transfer gate 607 is off, signal charge transfer is not performed. The memory unit 608 is in a reset state during the charge accumulation period. The AF CPU 600 turns on the transfer gate 607 at the same time as the end of the accumulation operation to transfer the signal charges integrated by the sensor unit 606 to the memory unit 608.

The memory unit 608 temporarily stores the transferred signal charges on the pixel basis, converts the signal charges into a voltage, and amplifies the voltage by a predetermined gain.

As described above, line sensor #2 includes a sensor array that does not transfer charges from the sensor unit 606 to the memory unit 608 during the charge accumulation period, causes the sensor unit 606 to integrate the charges on the pixel basis, and transfers the charges to the memory unit 608 after the end of charge accumulation. In this specification, such a sensor array will be referred to as a sensor array of a second type, and a line sensor comprised of sensor arrays of the second type will be referred to as a line sensor of the second type. Hence, all of line sensors #2, #4, #6, and #8 are line sensors of the second type.

Upon receiving the signal shift input from the AF CPU 600, the shift register 609 selects the output of the memory unit 608 on the pixel basis, and sequentially outputs the output of the memory unit 608 to the input of the output amplifier 611 during the time an analog switch 610 is turned on by a signal sel_2.

The AF CPU 600 includes a register (not shown). This register can externally read and write by serial communication using terminals cs, sclk, miso, and mosi that are communication terminals of the AF CPU 600. Setting the value of the register from outside (for example, camera CPU 100) allows to control the operation of the focus detection sensor 101.

(Accumulation Operation)

Figure 6:
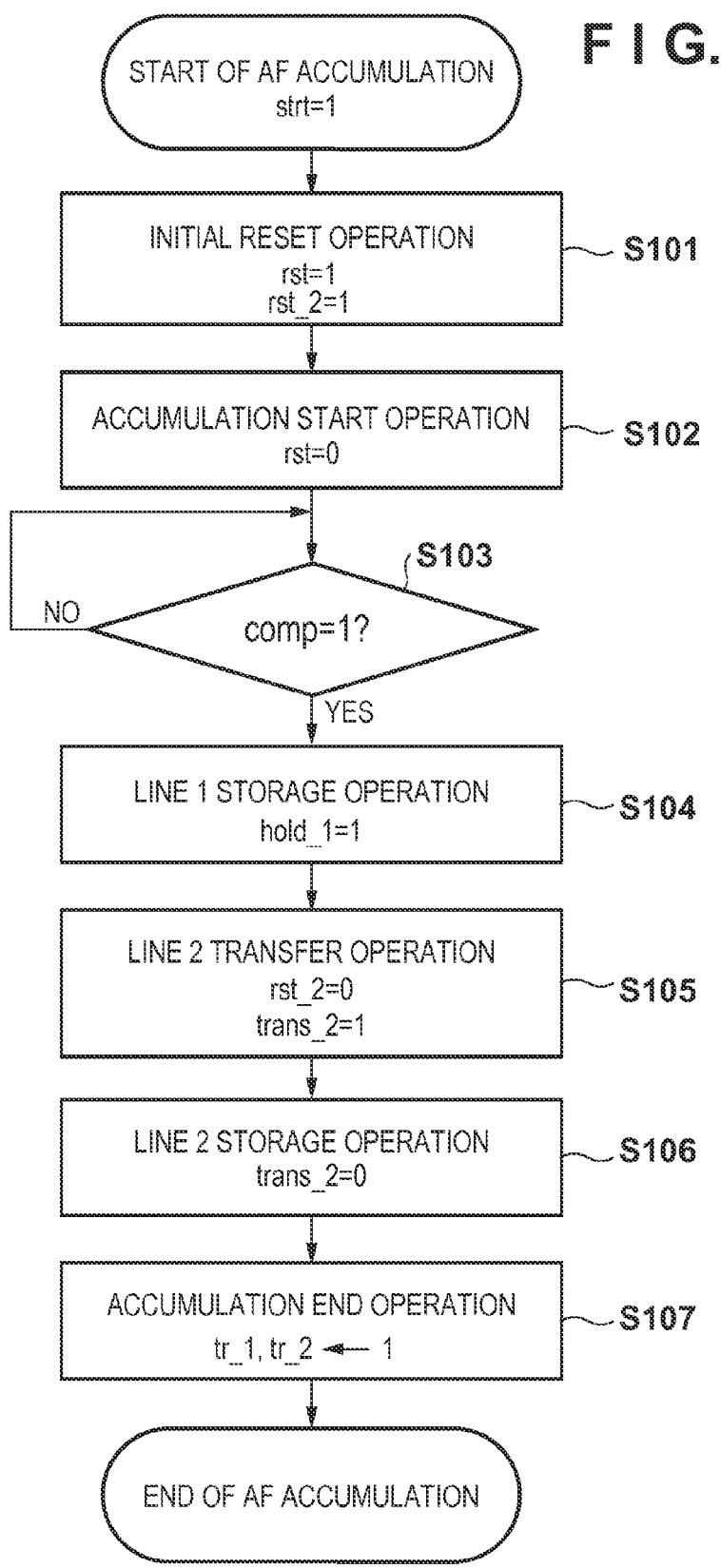
FIG. 6 is a flowchart for explaining the accumulation operation of the focus detection sensor according to the first embodiment of the present invention.

The accumulation operation of the focus detection sensor 101 according to this embodiment will be described next in detail with reference to the flowchart of FIG. 6. The accumulation operation of line sensors #1 and #2 will representatively be explained here, and this also applies to other line sensors #3 to #8.

For example, when the camera CPU 100 sets a register strt of the AF CPU 600 to 1, the AF CPU 600 starts the accumulation operation of the focus detection sensor 101.

In step S101, the AF CPU 600 performs the initial reset operation of line sensors #1 and #2. More specifically, the AF CPU 600 clears the register of its own to 0 and then outputs signals rst and rst_2 to clear charges in the sensor units 601 and 606 and the memory units 602 and 608. Note that in this specification, "outputting a signal" can be changing a signal value (level) from 0 (low level) to 1 (high level), and "ending (canceling) signal output" can be changing a signal value (level) from 1 (high level) to (low level).

In step S102, the AF CPU 600 ends outputting the signal rst (changes the signal value to 0). Reset of the sensor units 601 and 606 and the memory unit 602 is thus completed, and the sensor units 601 and 606 start charge accumulation. On the other hand, since the AF CPU 600 continuously outputs the signal rst_2, the memory unit 608 is continuously reset.

In step S103, the AF CPU 600 determines the signal comp output from the comparator 612. More specifically, if line sensor #1 has accumulated sufficient charges, and the charge accumulation should end, p-out>VR, and comp=1 is output. If the value of the signal comp is 1 in step S103, the AF CPU 600 executes accumulation end processing from step S104. If p-out≤VR (charge accumulation is insufficient), comp=0 is output. Hence, the AF CPU 600 continues to determine the signal comp in step S103.

In step S104, the AF CPU 600 outputs a signal hold 1 to store, in the memory unit 602 of line 1 (line sensor #1), the accumulated charges integrated by the memory unit 602.

In step S105, the AF CPU 600 cancels output of the signal rst_2 to complete reset of the memory unit 608. After that, the AF CPU 600 outputs a signal trans_2 to turn on the transfer gate 607 and thus transfer the accumulated charges integrated by the sensor unit 606 of line 2 (line sensor #2) to the memory unit 608. In line sensor #2, charge transfer from the sensor unit 606 to the memory unit 608 is not performed during the charge accumulation period. The memory unit 608 is continuously reset from the end of accumulation to a timing immediately before the accumulated charges are transferred. For this reason, noise generated in the memory unit 608 during the charge accumulation period is not accumulated in the memory unit 608.

In step S106, the AF CPU 600 cancels output of the signal trans_2 to turn off the transfer gate 607. The charges transferred in step S105 (charges accumulated in line 2) are thus stored in the memory unit 608.

In step S107, the AF CPU 600 sets 1 to registers tr_1 and tr_2 provided in it and representing an accumulation end flag, thereby ending the accumulation operation. Reading out the values of the registers tr_1 and tr_2 from outside (for example, camera CPU 100) allows the end of accumulation in line sensors #1 and #2 to be known.

As described above, in this embodiment, one (line sensor #1) of a pair of line sensors adjacently arranged at almost the same position includes a sensor array of the first type that transfers accumulated charges from the sensor unit 601 to the memory unit 602 and integrates them during the charge accumulation period. The other line sensor (line sensor #2) includes a sensor array of the second type that causes the sensor unit 606 to integrate accumulated charges. In the line sensor of the second type including the sensor array of the second type, noise generated in the memory unit 608 during the charge accumulation period does not affect the integrated accumulated charges. In addition, the memory unit 608 is continuously reset during the charge accumulation period, and after that, the charges are transferred to the memory unit 608. This allows to eliminate the influence of noise generated in the memory unit 608 during the charge accumulation period on the accumulated charges transferred to the memory unit 608.

When the signal p-out output from line sensor #1 exceeds the reference voltage VR having the predetermined value, the accumulation operation of line sensors #1 and #2 ends. This enables to end accumulation processing of the line sensors at an appropriate timing during the charge accumulation period.

In addition, line sensor #1 used as an accumulated charge monitor measurement line sensor can also obtain the first image and the second image from pixels as many as those of line sensor #2.

Only the operation of line sensors #1 and #2 has been described above with reference to the flowchart of FIG. 6. The same operation is performed for line sensors #3 to #8 as well. The AF CPU 600 includes registers tr_3 to tr_8 for line sensors #3 to #8. The signal lines are also provided for line sensors #3 to #8. Line sensors #3, #5, and #7 are constituted and operated as line 1, whereas line sensors #4, #6, and #8 are constituted and operated as line 2.

(Operation of Camera)

An example of the operation of the camera including the above-described focus detection sensor 101 will be described in detail with reference to the flowchart of FIG. 7. This operation is executed by the camera CPU 100 when the switch SW1 of the camera shown in FIG. 2 is turned on.

In step S201, the camera CPU 100 communicates with the AF CPU 600 of the focus detection sensor 101, and sets 1 to the register strt of the AF CPU 600, thereby starting the AF accumulation operation. The focus detection sensor 101 thus starts the accumulation operation described with reference to FIG. 6 for line sensors #1 to #8.

In step S202, the camera CPU 100 determines, based on the values of the registers tr_1 to tr_8 of the AF CPU 600, whether the accumulation operation of the focus detection sensor 101 has ended. If all the registers tr_1 to tr_8 have a value "1", accumulation has ended for all of line sensors #1 to #8. Hence, the camera CPU 100 performs a signal read operation in step S203. If at least one of the registers tr_1 to tr_8 has a value "0", the camera CPU 100 determines that a line sensor that has not ended accumulation remains, and continuously executes the same processing until the end of accumulation is detected.

In step S203, the camera CPU 100 communicates with the AF CPU 600, and reads pixel signals obtained by line sensors #1 to #8. The AF CPU 600 outputs the signal shift in accordance with a read instruction so as to drive the shift registers of line sensors #1 to #8 and read the signals, and outputs the signals to the camera CPU 100. The camera CPU 100 sequentially A/D-converts the pixel signals of line sensors #1 to #8 output from the focus detection sensor 101, and stores the signals in a RAM (not shown).

In step S204, the camera CPU 100 calculates defocus amounts from the pixel signals of line sensors #1 to #8 obtained in step S203. The defocus amount calculation results obtained by the sets of line sensors such as line sensors #1 and #2, line sensors #3 and #4, line sensors #5 and #6, and line sensors #7 and #8 that are adjacently arranged at almost the same position are averaged, or weighted and averaged, to obtain a final result. In addition, the defocus amount at each of the distance measurement points 501 to 503 shown in FIG. 5B and which one of the distance measurement points 501 to 503 is the main subject position are decided from the four defocus amounts obtained in the above-described manner. As the defocus amount for the distance measurement point 501 at the center, one of the vertical defocus amount by line sensors #1 and #2 and the horizontal defocus amount by line sensors #3 and #4 is selected. Although the selection method is not particularly limited, a defocus amount that is supposed to be more reliable because of, for example, high contrast or high waveform correlation of image signals can be selected.

In step S205, if the defocus amount at one of the distance measurement points falls within a desired range of, for example, ¼Fδ (F: f-number of lens, and δ: constant (20 μm)) or less, the camera CPU 100 determines that an in-focus state is obtained. More specifically, in case of, for example, f-number F=2.0, if the defocus amount is 10 μm or less, the camera CPU 100 determines that an in-focus state is obtained, and advances the process to step S207.

On the other hand, if all defocus amounts are larger than ¼Fδ, in step S206, the camera CPU 100 instructs the imaging lens via the lens communication circuit 104 to drive the lenses by an amount corresponding to one of the defocus amounts obtained for the distance measurement points in step S204. The camera CPU 100 returns the process to step S201 and repeats the above-described operation until it determines that an in-focus state is obtained. Although the defocus amount selection method in step S206 is not limited, for example, the defocus amount for the distance measurement point corresponding to the subject at the shortest distance or the smallest defocus amount can be selected.

In step S207, the camera CPU 100 detects the state of the switch SW2. If the switch SW2 is on, the image capture operation from step S301 starts. If the switch SW2 is off in step S207, the camera CPU 100 detects the state of the switch SW1 in step S208. If the switch SW1 is still on in step S208, the camera CPU 100 repeats the processing from step S201. If the switch SW1 is off, the AF operation ends.

The image capture operation from step S301 will be described next.

In step S301, the camera CPU 100 obtains a subject luminance BV from the photometric value detected using the photometric sensor 106, and adds the subject luminance BV to a set ISO speed SV to obtain an exposure value EV. The camera CPU 100 then decides an aperture value AV and a shutter speed TV corresponding to the exposure value EV by a known method of, for example, using a predetermined program diagram.

In step S302, the camera CPU 100 retracts the quick return mirror 201 from the image capture optical path and simultaneously instructs the imaging lens 200 via the lens communication circuit 104 to set the stop to an aperture corresponding to the aperture value AV decided in step S301.

After that, when the quick return mirror 201 has completely retracted from the image capture optical path, in step S303, the camera CPU 100 controls the shutter speed via the shutter control circuit 107 based on the energized period of the electromagnets 117*a* and 117*b*, thereby exposing the image sensor 105.

In step S304, the camera CPU 100 returns the quick return mirror 201 to the position in the image capture optical path, and ends the image capture operation. Note that since processing (so-called development processing and processing of recording the signal in a recording medium) of the image signal accumulated in the image sensor 105 can be known processing and is not directly relevant to the present invention, a description thereof will be omitted.

As described above, according to this embodiment, a line sensor of a first type including a sensor array of the first type having an arrangement for transferring charges from a sensor unit and integrating them during the charge accumulation period, and a line sensor of a second type including a sensor array of the second type having an arrangement for causing a sensor unit to integrate charges during the charge accumulation period without transferring them from the sensor unit are adjacently arranged at almost the same position, thereby forming a focus detection sensor.

With this arrangement, since the line sensor of the first type can monitor the accumulated charges during the charge accumulation period, the charge accumulation period can appropriately be controlled, and the line sensor of the second type can detect a high-quality image signal. In addition, since the line sensor of the first type can also obtain an image signal, phase difference detection can be done based on two pairs of image signals at almost the same position, and more accurate focus detection can be implemented. Furthermore, since the arrangement of the line sensor of the first type and the line sensor of the second type is not particularly limited, the focus detection sensor can easily be designed.

Note that the above description has been made assuming that the sensor array of the second type continuously resets the memory unit 608 during the charge accumulation period. However, the influence of noise generated in the memory unit 608 during the charge accumulation period can also be eliminated by resetting the memory unit 608 immediately before charge transfer.

Second Embodiment

In the focus detection sensor according to the first embodiment, one line sensor of a set of line sensors adjacently arranged at almost the same position is the line sensor of the first type capable of monitoring accumulated charges, and the other is the line sensor of the second type that causes the sensor unit to integrate the accumulated charges. That is, the integration/transfer operation changes for each sensor array. However, as a characteristic feature of the second embodiment, each even-numbered pixel of a sensor array is formed as a pixel of a first type, and each odd-numbered pixel is formed as a pixel of a second type, thereby changing the integration/transfer operation on the pixel basis.

The arrangement of a camera according to this embodiment and the arrangement of line sensors in a focus detection sensor can be the same as in the first embodiment, and a description thereof will be omitted.

Figure 8:
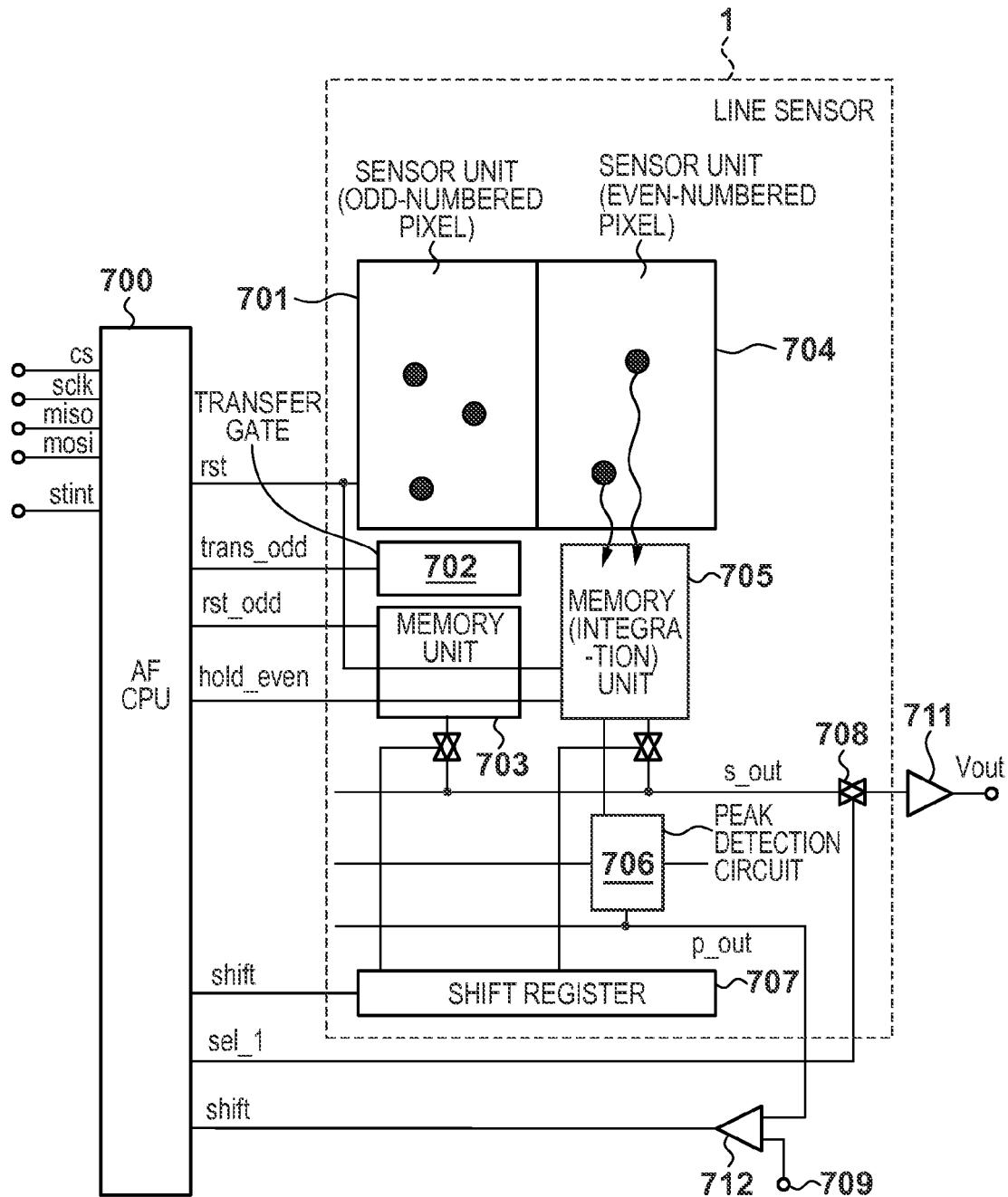
FIG. 8 is a block diagram showing an example of the electrical arrangement of a focus detection sensor according to the second embodiment of the present invention.

FIG. 8 is a block diagram showing an example of the electrical arrangement of a focus detection sensor 401 according to this embodiment.

FIG. 8 illustrates the electrical block of two pixels (an odd-numbered pixel and an even-numbered pixel) of a sensor array included in line sensor #1. In fact, the two pixels shown in FIG. 8 are continuously arranged in each sensor array. Line sensors #2 to #8 have the same arrangement as that of line sensor #1, and a description thereof will be omitted.

The focus detection sensor 401 includes an automatic focus detection CPU (AF CPU) 700. The AF CPU 700 controls the accumulation operation and image signal read operation of each sensor array. The AF CPU 700 is connected to the sensor array of line sensor #1 to control the odd-numbered pixel and the even-numbered pixel.

The odd-numbered pixel includes a sensor unit 701 that performs photoelectric conversion and integrates charges generated by the photoelectric conversion, a transfer gate 702, and a memory unit 703 that stores the integrated charges. The signal charges photoelectrically converted by the sensor unit 701 of the odd-numbered pixel are integrated by the sensor unit 701 without being transferring until the end of the charge accumulation period.

The transfer gate 702 is turned on at the same time as the end of the charge accumulation period to transfer the signal charges integrated by the sensor unit 701 to the memory unit 703. The memory unit 703 temporarily stores the transferred charges, converts the charges into a voltage, and amplifies the voltage by a predetermined gain.

On the other hand, the even-numbered pixel includes a sensor unit 704 that performs photoelectric conversion and transfers charges generated by the photoelectric conversion, a memory unit 705 that integrates the transferred signal charges and temporarily stores them, and a peak detection circuit 706 that detects the maximum value out of the voltage values in the memory unit 705 of the even-numbered pixel.

Signal charges photoelectrically converted by the sensor unit 704 of the even-numbered pixel are directly transferred to the memory unit 705 and integrated by the memory unit 705 on the pixel basis. The memory unit 705 converts the integrated signal charges into a voltage, and amplifies the voltage by a predetermined gain. The memory unit 705 also temporarily stores the integrated signal charges at the same time as the end of the charge accumulation period.

The peak detection circuit 706 outputs, to the input portion of a comparator 712, a maximum value (p-out) out of the voltage values stored in the memory units 705 of the even-numbered pixel group.

The comparator 712 compares the signal p-out with a reference voltage VR having a predetermined value, and outputs a signal comp representing the comparison result to the AF CPU 700. The signal comp is 1 when p-out>VR, and 0 otherwise. Note that the reference voltage VR having the predetermined value is set to a value representing that the accumulation operation should end when p-out>VR.

Upon receiving a signal shift input from the AF CPU 700, a shift register 707 selects the output of the memory unit 703 or 705 on the pixel basis. The shift register 707 sequentially outputs the output of the memory unit 703 or 705 to the input of an output amplifier 711 during the time an analog switch 708 is turned on by a signal sel_1. The output amplifier 711 outputs a pixel signal Vout from the terminal Vout by an appropriate gain.

The AF CPU 700 of this embodiment can also read and write an internal register value by externally performing serial communication using terminals cs, sclk, miso, and mosi, like the AF CPU 600 according to the first embodiment.

(Accumulation Operation)

Figure 9:
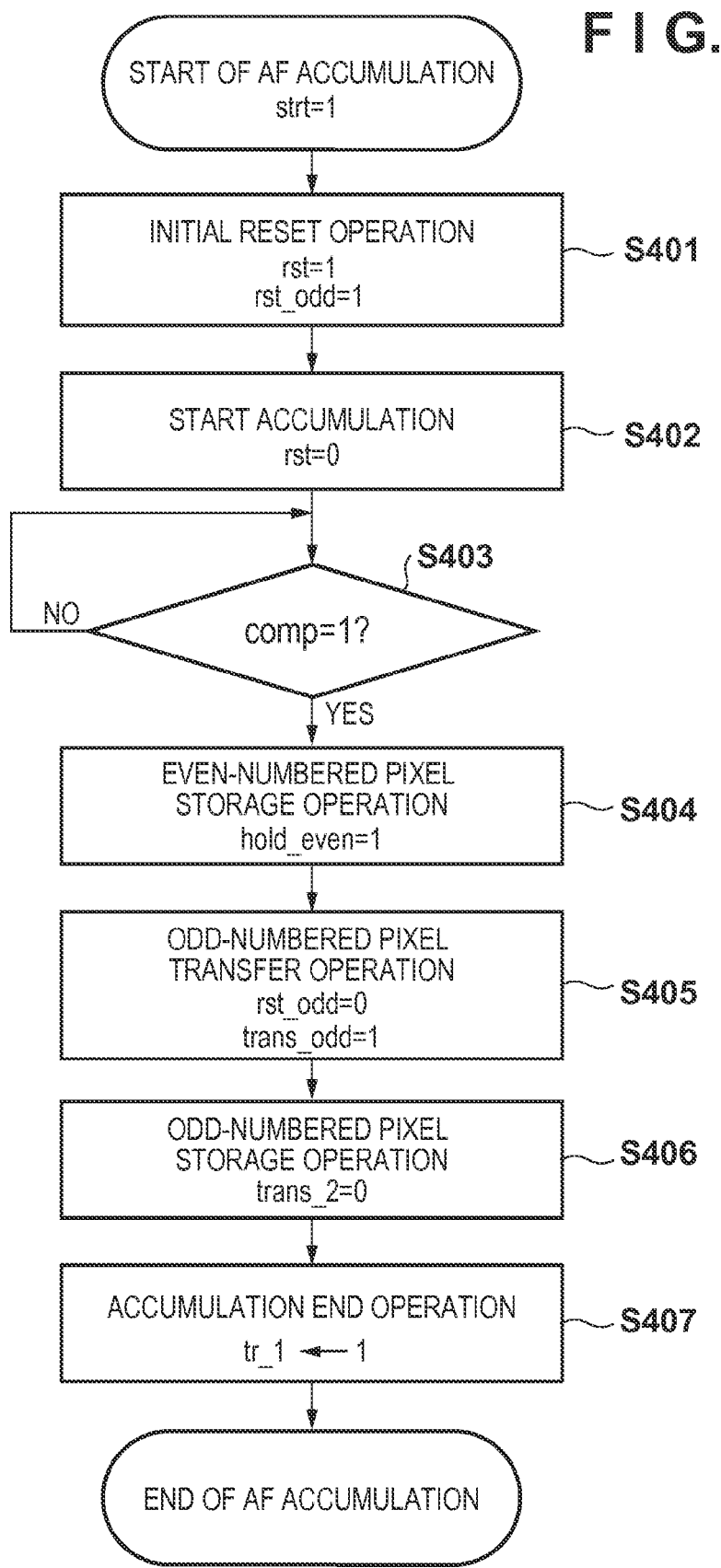
FIG. 9 is a flowchart for explaining the accumulation operation of the focus detection sensor according to the second embodiment of the present invention.

The accumulation operation of the focus detection sensor 401 according to this embodiment will be described next in detail with reference to the flowchart of FIG. 9. The accumulation operation of line sensor #1 will representatively be explained here, and this also applies to other line sensors #2 to #8.

For example, when a camera CPU 100 sets a register strt of the AF CPU 700 to 1, the AF CPU 700 starts the accumulation operation of the focus detection sensor 401.

In step S401, the AF CPU 700 performs the initial reset operation of line sensor #1. More specifically, the AF CPU 700 clears the register of its own to 0 and then outputs signals rst and rst_odd to clear charges in the sensor units 701 and 704 and the memory units 703 and 705.

In step S402, the signal rst is canceled to start accumulation. Since the AF CPU 700 continuously outputs the signal rst_odd, the memory unit 703 of the odd-numbered pixel is continuously reset even during accumulation.

In step S403, the AF CPU 700 determines the signal comp output from the comparator 712. As described above, if the even-numbered pixels of line sensor #1 have accumulated sufficient charges, and the charge accumulation should end, p-out>VR, and comp=1 is output. If the value of the signal comp is 1 in step S403, the AF CPU 700 executes accumulation end processing from step S404. If p-out≤VR (charge accumulation is insufficient), comp=0 is output. Hence, the AF CPU 700 continues to determine the signal comp in step S403.

In step S404, the AF CPU 700 outputs a signal hold_even to store, in the memory unit 705 of the even-numbered pixel, the accumulated charges integrated by the memory unit 705.

In step S405, the AF CPU 700 cancels output of the signal rst_odd to complete reset of the memory unit 703. After that, the AF CPU 700 outputs a signal trans_odd to turn on the transfer gate 702 and thus transfer the accumulated charges integrated by the sensor unit 701 of the odd-numbered pixel to the memory unit 703. In the odd-numbered pixel, charge transfer from the sensor unit 701 to the memory unit 703 is not performed during the charge accumulation period. The memory unit 703 is continuously reset from the end of accumulation to a timing immediately before the accumulated charges are transferred. For this reason, noise generated in the memory unit 703 during the charge accumulation period is not accumulated in the memory unit 703.

In step S406, the AF CPU 700 cancels output of the signal trans_odd to turn off the transfer gate 702. The charges transferred in step S405 (charges accumulated in the odd-numbered pixel) are thus stored in the memory unit 703.

In step S407, the AF CPU 700 sets 1 to a register tr_1 provided in it and representing an accumulation end flag, thereby ending the accumulation operation of line sensor #1. Reading out the value of the register tr_1 from outside (for example, camera CPU 100) allows to know the end of accumulation in line sensor #1.

As described above, in this embodiment, each even-numbered pixel of a line sensor is formed as a pixel of the first type that transfers accumulated charges from the sensor unit 704 to the memory unit 705 and integrates them during the charge accumulation period. Each odd-numbered pixel of the line sensor is formed as a pixel of the second type that causes the sensor unit 701 to integrate accumulated charges. In the pixel of the second type, noise generated in the memory unit 703 during the charge accumulation period does not affect the integrated accumulated charges. In addition, the memory unit 703 is continuously reset during the charge accumulation period, and after that, the charges are transferred to the memory unit 703. This allows to eliminate the influence of noise generated in the memory unit 703 during the charge accumulation period on the accumulated charges transferred to the memory unit 703.

When the signal p-out representing the maximum voltage value of the accumulated charges of the even-numbered pixel exceeds the reference voltage VR having the predetermined value, the accumulation operation of the odd- and even-numbered pixels ends. This enables to end accumulation processing at an appropriate timing during the charge accumulation period.

Note that the odd-numbered pixel may be formed as the pixel of the first type, and the even-numbered pixel may be formed as the pixel of the second type, as is apparent.

Only the operation of line sensor #1 has been described above with reference to the flowchart of FIG. 9. The same operation is performed for line sensors #2 to #8 as well. The AF CPU 700 includes registers tr_2 to tr_8 for line sensors #2 to #8. The signal lines are also provided for line sensors #2 to #8.

(Operation of Camera)

The operation of the camera including the focus detection sensor 401 according to the second embodiment can basically be the same as the operation of the first embodiment described with reference to the flowchart of FIG. 7. In the second embodiment, however, the timings to store the odd-numbered pixel signal and the even-numbered pixel signal in the memory units are slightly different. Hence, when an image signal is generated simply using the values of the pixel signals, the image signal may have low signal continuity between adjacent pixels.

Hence, when generating a pair of image signals to be used for phase difference detection from signals read from the line sensors in step S203, processing of improving the signal continuity between adjacent pixels can be performed.

More specifically, for pixel signals read and A/D-converted in step S203, for example, an image signal is generated from the simple moving average of the signals of two adjacent pixels. This allows to improve the continuity of the image signal and consequently increase the accuracy of defocus calculation.

As described above, in this embodiment, each sensor array is formed by alternately arranging a pixel of a first type having an arrangement for transferring charges from a sensor unit and integrating them during the charge accumulation period, and a pixel of a second type having an arrangement for causing a sensor unit to integrate charges during the charge accumulation period without transferring the charges from the sensor unit.

Hence, a pair of sensor arrays can have the function of the line sensor of the first type and that of the line sensor of the second type according to the first embodiment. In the first embodiment, the line sensor of the first type and the line sensor of the second type need to be adjacently arranged at almost the same position. In the second embodiment, however, arranging one line sensor suffices. To increase the defocus amount detection accuracy, two line sensors may adjacently be arranged while shifting the pixel pitch, as a matter of course.

Third Embodiment

In the third embodiment, a line sensor of a first type and a line sensor of a second type are used, as in the first embodiment. However, the arrangement method of the line sensor of the first type and the line sensor of the second type is different. The arrangement except the focus detection optical system can be the same as in the first embodiment, and a description thereof will not be repeated.

Figure 10A:
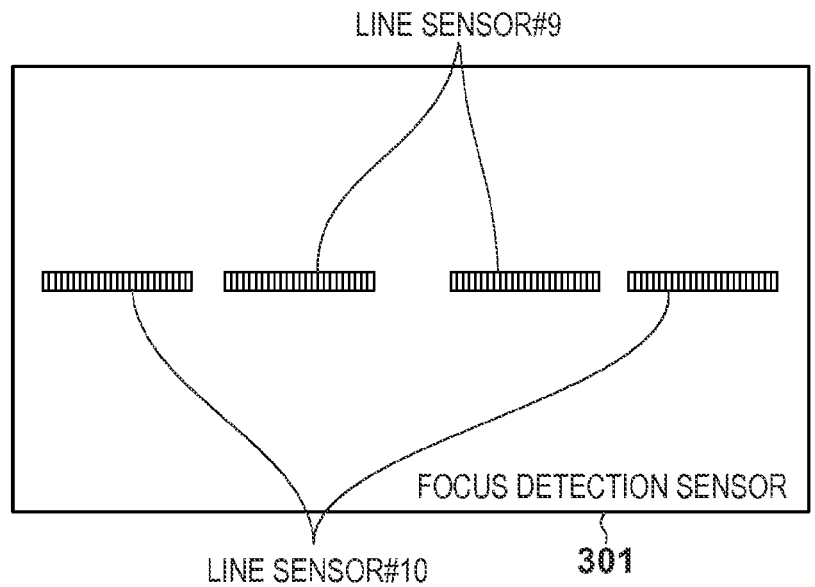
FIG. 10A is a view showing an example of the arrangement of line sensors in a focus detection sensor according to the third embodiment of the present invention.

FIG. 10A is a view showing an example of the arrangement of line sensors in a focus detection sensor 301 according to this embodiment. Each of line sensors #9 and #10 is comprised of a pair of sensor arrays. In this embodiment, line sensors #9 and #10 are arranged in the same direction at almost the same horizontal position of the focus detection sensor 301, as shown in FIG. 10A. In addition, the line sensors are arranged such that the center distance (base line length) of the sensor arrays included in line sensor #9 becomes shorter than the center distance of the sensor arrays included in line sensor #10.

Figure 11:
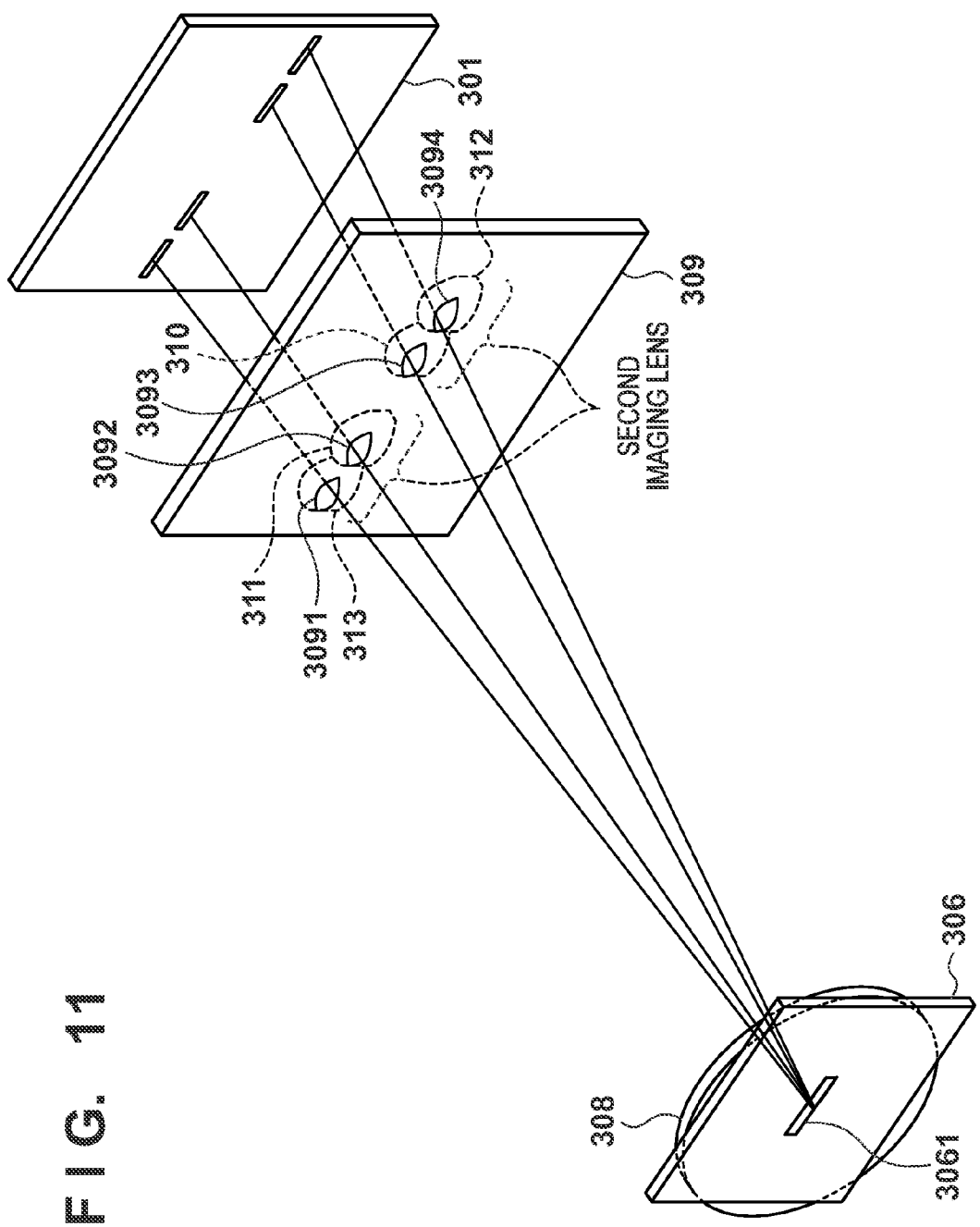
FIG. 11 is a perspective view schematically showing the arrangement of a focus detection optical system provided in a camera according to the third embodiment of the present invention.

FIG. 11 is a perspective view schematically showing the arrangement of the focus detection optical system according to this embodiment. Note that FIG. 11 illustrates an arrangement excluding the mirrors and the infrared cut filter 207 of the focus detection optical system shown in FIG. 3 for easy description and understanding.

The light beam of the subject image reflected by a sub-mirror 205 temporarily forms an image near a field-of-view mask 306. The field-of-view mask 306 is a light shielding member configured to decide a focus detection area (distance measurement point) in the field of view (screen). The field-of-view mask 306 has an opening portion 3061 that is long in the horizontal direction and arranged at the center.

A field lens 308 has an effect of forming the images of opening portions 3091 to 3094 of a stop 309 near the exit pupil of an imaging lens 200. Second imaging lenses 310 to 313 are arranged behind the stop 309. The second imaging lenses 310 to 313 are arranged in correspondence with the opening portions 3091 to 3094 of the stop 309, respectively.

The light beams that have passed through the two second imaging lenses 310 and 311 close to the center form images on line sensor #9 of the focus detection sensor 301. The light beams that have passed through the two second imaging lenses 312 and 313 on the outer sides form images on line sensor #10 of the focus detection sensor 301. The optical axis distance (to be referred to as a base line length hereinafter) of the second imaging lenses 310 and 311 is shorter than the base line length of the second imaging lenses 312 and 313. Hence, although the defocus amount detectable by line sensor #9 is larger than that of line sensor #10, the defocus amount detection accuracy is lower in line sensor #9 than in line sensor #10.

Figure 10B:
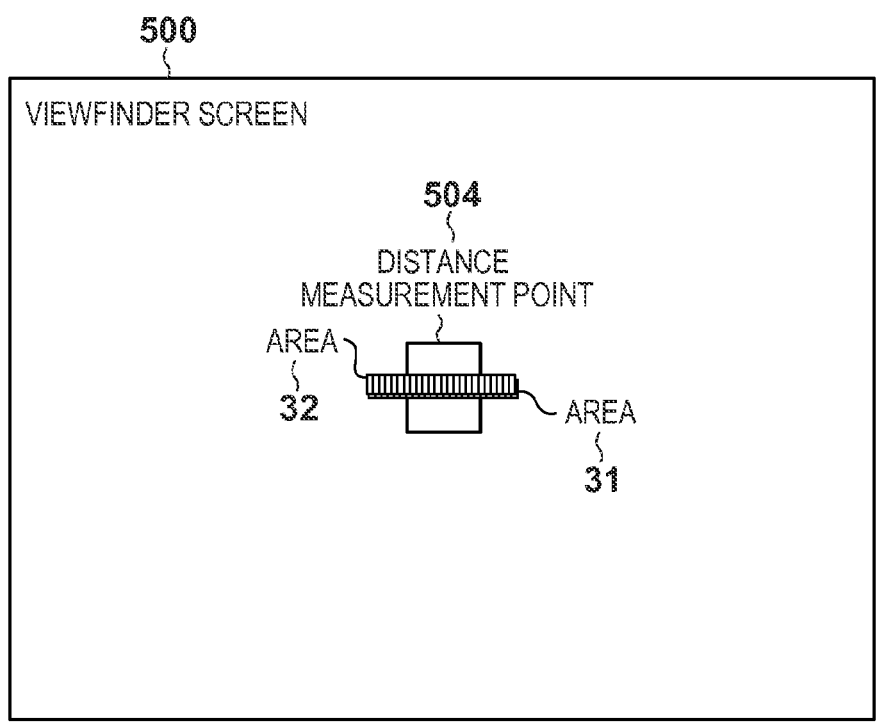
FIG. 10B is a view showing an example of the positional relationship between the line sensors and distance measurement points on a viewfinder screen corresponding to the focus detection sensor shown in FIG. 10A.

FIG. 10B is a view showing an example of the positional relationship between the line sensors and distance measurement points on a viewfinder screen corresponding to the focus detection sensor 301 shown in FIG. 11.

A distance measurement point 504 corresponding to line sensors #9 and #10 exists on a viewfinder screen 500 (field of view). The distance measurement point 504 includes areas #31 and #32 in the horizontal direction. Area #31 is an area to project line sensor #9. Area #32 is an area to project line sensor #10. That is, line sensors #9 and #10 are projected on almost the same area of the viewfinder screen 500.

The electrical arrangement and operation of the focus detection sensor 301 can be explained by replacing line sensors #1 and #2 with line sensors #9 and #10 in the description of the first embodiment, and a description thereof will be omitted here. Note that the accumulation end registers of line sensors #9 and #10 are registers tr_1 and tr_2.

In this embodiment, line sensor #9 is a line sensor of a first type having an arrangement for transferring charges from a sensor unit and integrating them during the charge accumulation period, and line sensor #10 is a line sensor of a second type having an arrangement for causing a sensor unit to integrate charges during the charge accumulation period without transferring the charges from the sensor unit. Appropriate accumulation control can be performed by controlling the charge accumulation periods of line sensors #9 and #10 by end determination based on a signal p-out of line sensor #9.

Figure 12:
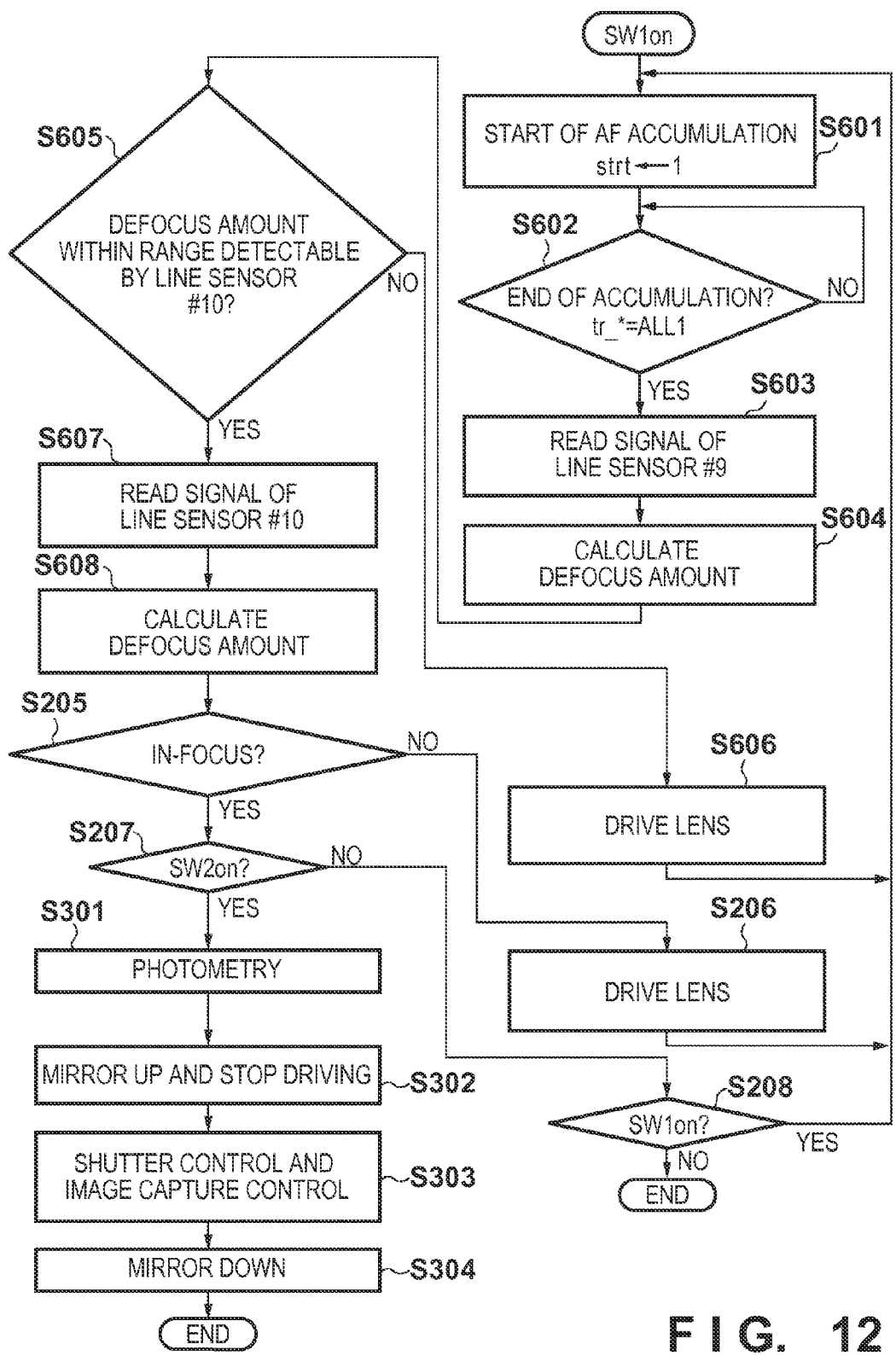
FIG. 12 is a flowchart for explaining an example of the operation of the camera including the focus detection sensor according to the third embodiment of the present invention.

The operation of a camera including the focus detection sensor 301 of this embodiment will be described in detail with reference to the flowchart of FIG. 12. The same step numbers as in FIG. 7 denote the same processing steps in FIG. 12, and a description thereof will not be repeated.

In step S601, a camera CPU 100 communicates with an AF CPU 600 of the focus detection sensor 301, and sets 1 to a register strt of the AF CPU 600, thereby starting the AF accumulation operation. The focus detection sensor 301 thus starts the accumulation operation described with reference to FIG. 6 for line sensors #9 to #10.

In step S602, the camera CPU 100 determines, based on the values of the registers tr_1 and tr_2 of the AF CPU 600, whether the accumulation operation of the focus detection sensor 301 has ended. If both the registers tr_1 and tr_2 have a value "1", accumulation has ended for both line sensors #9 and #10. Hence, the camera CPU 100 performs a signal read operation in step S603. If at least one of the registers tr_1 and tr_2 has a value "0", the camera CPU 100 determines that a line sensor that has not ended accumulation remains, and continuously executes the same processing until the end of accumulation is detected.

In step S603, the camera CPU 100 communicates with the AF CPU 600, and reads pixel signals obtained by line sensor #9. The AF CPU 600 outputs a signal shift in accordance with a read instruction so as to drive the shift register of line sensor #9 and read the signals, and outputs the signals to the camera CPU 100. The camera CPU 100 sequentially A/D-converts the pixel signals of line sensor #9 output from the focus detection sensor 301, and stores the signals in a RAM (not shown).

In step S604, the camera CPU 100 calculates a defocus amount from the pixel signals of line sensor #9 obtained in step S603.

In step S605, if the defocus amount obtained in step S604 falls within a range detectable by line sensor #10, for example, 4Fδ (F: f-number of lens, and δ: constant (20 μm)) or less, the camera CPU 100 advances the process to step S607.

On the other hand, if the defocus amount is larger than 4Fδ, in step S606, the camera CPU 100 instructs the imaging lens via a lens communication circuit 104 to drive the lenses by an amount corresponding to the defocus amount obtained in step S604. The camera CPU 100 returns the process to step S601 and repeats the above-described operation until the defocus amount obtained in step S604 is 4Fδ or less.

In step S607, the camera CPU 100 communicates with the AF CPU 600 and reads pixel signals obtained by line sensor #10. The AF CPU 600 outputs the signal shift in accordance with a read instruction so as to drive the shift register of line sensor #10 and read the signals, and outputs the signals to the camera CPU 100. The camera CPU 100 sequentially A/D-converts the pixel signals of line sensor #10 output from the focus detection sensor 301, and stores the signals in a RAM (not shown).

In step S608, the camera CPU 100 calculates a defocus amount from the pixel signals of line sensor #10 obtained in step S607.

In step S205, if the defocus amount calculated in step S608 falls within a desired range of, for example, ¼Fδ (F: f-number of lens, and δ: constant (20 μm)) or less, the camera CPU 100 advances the process to step S207.

On the other hand, if the defocus amount calculated in step S608 is larger than ¼Fδ, in step S206, the camera CPU 100 instructs the imaging lens via the lens communication circuit 104 to drive the lenses by an amount corresponding to the defocus amount obtained in step S608. The camera CPU 100 returns the process to step S601 and repeats the above-described operation until it determines that an in-focus state is obtained.

Processing from step S207 after the determination of the in-focus state is the same as that described in the first embodiment, and a description thereof will be omitted.

As described above, in this embodiment, a line sensor of a first type including a sensor array of the first type having an arrangement for transferring charges from a sensor unit and integrating them during the charge accumulation period, and a line sensor of a second type including a sensor array of the second type having an arrangement for causing a sensor unit to integrate charges during the charge accumulation period without transferring the charges from the sensor unit are arranged in correspondence with a single distance measurement point such that the line sensor of the first type can detect a defocus amount larger than that of the line sensor of the second type, thereby forming a focus detection sensor.

Hence, after the focusing lens is driven to near the in-focus position based on the defocus amount detected by the line sensor of the first type, a more accurate defocus amount can be detected by the line sensor of the second type.

AF control is thus finally performed based on the signals from line sensor #10 having a long base line length and a high detection accuracy, in addition to the same effects as in the first embodiment. Additionally, since line sensor #10 is the line sensor of the second type that does not perform transfer during the charge accumulation period, the defocus amount can be detected more accurately, resulting in higher in-focus accuracy.

Fourth Embodiment

The fourth embodiment of the present invention will be described next. In the above-described first to third embodiments, the line sensor type (first type or second type) is fixed. As a characteristic feature of the fourth embodiment, the first type and the second type are electrically switchable. The arrangement of a camera and the arrangement of line sensors are the same as in the first embodiment, and a description thereof will not be repeated.

A focus detection sensor 901 capable of electrically switching the first type and the second type is used in place of the focus detection sensor 101.

Figure 13:
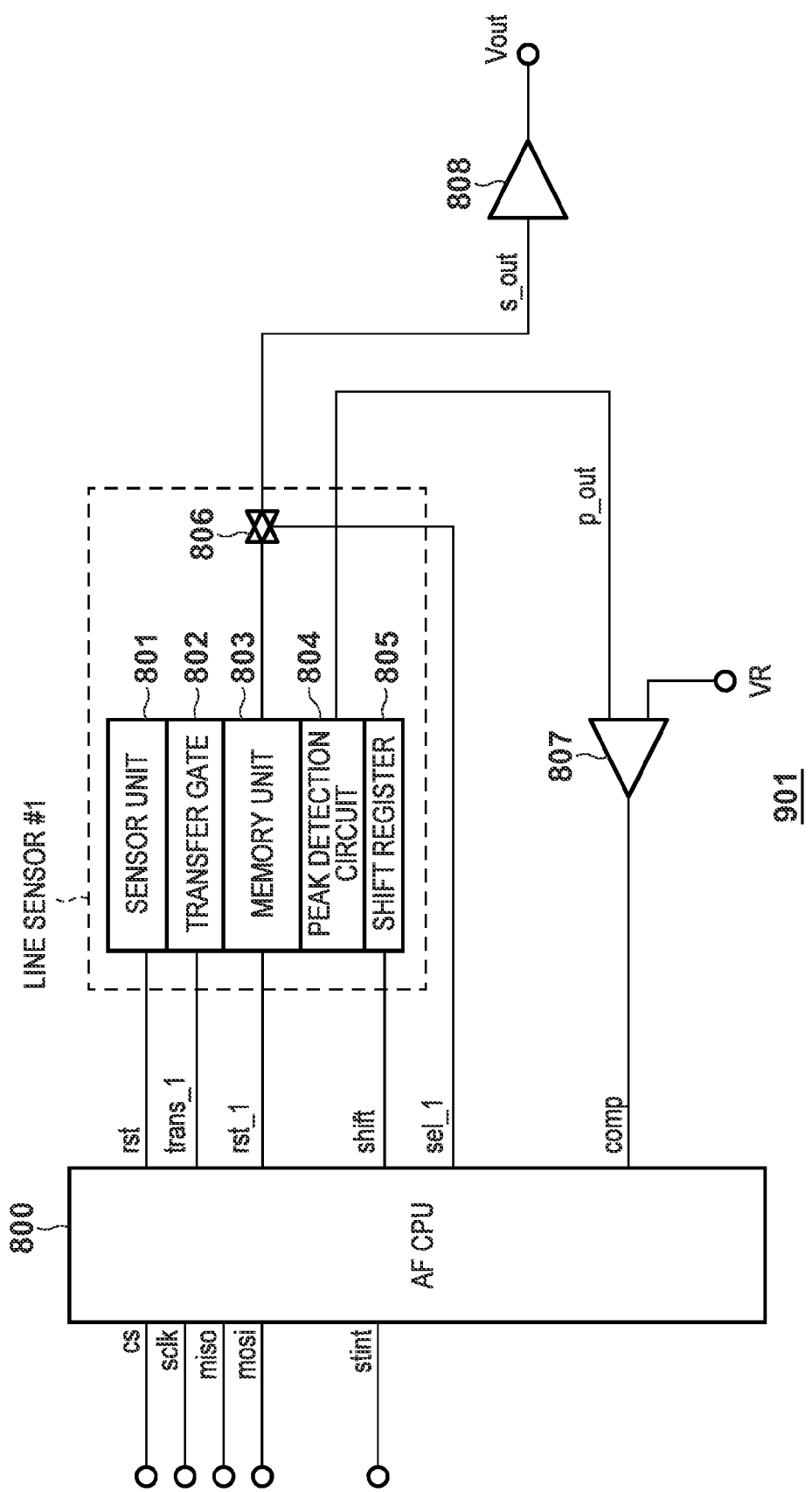
FIG. 13 is a block diagram showing an example of the electrical arrangement of a focus detection sensor according to the fourth embodiment of the present invention.

FIG. 13 is a block diagram showing an example of the arrangement of the focus detection sensor 901 according to this embodiment. FIG. 13 illustrates only line sensor #1 out of line sensors #1 to #8 shown in FIG. 5A. However, line sensors #2 to #8 have the same arrangement as well.

The focus detection sensor 901 includes an automatic focus detection CPU (AF CPU) 800. The AF CPU 800 controls the accumulation operation and image signal read operation of each sensor array.

Referring to FIG. 13, a sensor unit 801 corresponds to a photoelectric conversion device group included in a pair of sensor arrays of line sensor #1, like the sensor unit 601 shown in FIG. 5A. A memory unit 803 integrates signal charges photoelectrically converted by each pixel of the sensor unit 801 and temporarily stores the signal charges on the pixel basis.

A transfer gate 802 is provided between the sensor unit 801 and the memory unit 803. A peak detection circuit 804 detects the maximum value (p-out) out of the integrated values temporarily stored in the memory unit 803, and outputs the value to a comparator 807. A shift register 805 selects a pixel to read the integrated value from the memory unit 803.

The comparator 807 compares the maximum value (p-out) of the integrated values detected by the peak detection circuit 804 with a reference voltage VR having a predetermined value, and outputs a signal comp representing the comparison result to the AF CPU 800. The signal comp is 1 when p-out>VR, and 0 otherwise. Note that the reference voltage VR having the predetermined value is a pixel saturation voltage and is set to a value representing that the accumulation operation should end when p-out>VR.

Upon receiving a signal shift input from the AF CPU 800, the shift register 805 selects the output of the memory unit 803 on the pixel basis, and sequentially outputs the memory output to the input of an output amplifier 808 during the time an analog switch 806 is turned on by a signal sel_1 from the AF CPU 800.

The output amplifier 808 outputs a pixel signal from a terminal Vout by an appropriate gain.

The AF CPU 800 includes a register (not shown). This register can externally read and write by serial communication using terminals cs, sclk, miso, and mosi that are communication terminals of the AF CPU 800. Setting the value of the register from outside (for example, camera CPU 100) allows to control the operation of the focus detection sensor 901. In this embodiment, the AF CPU 800 includes a register mode, and the type of the focus detection sensor 901 can be controlled by the value of the register mode.

(Accumulation Operation)

Figure 14:
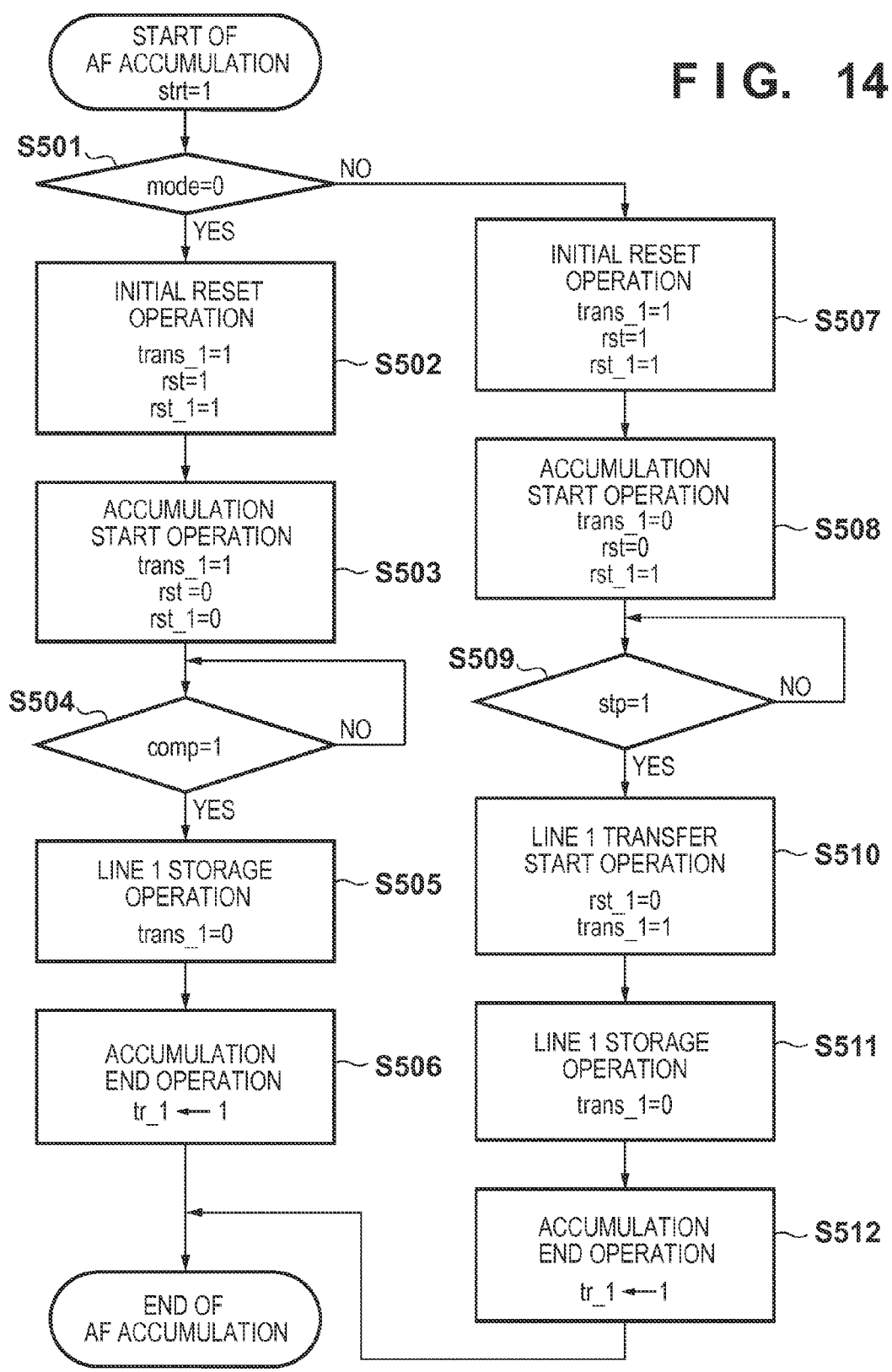
FIG. 14 is a flowchart for explaining the accumulation operation of the focus detection sensor according to the fourth embodiment of the present invention.

The accumulation operation of the focus detection sensor 901 according to this embodiment will be described next in detail with reference to the flowchart of FIG. 14. The accumulation operation of line sensor #1 will representatively be explained here, and this also applies to other line sensors #2 to #8.

For example, when the camera CPU 100 sets a register strt of the AF CPU 800 to 1, the AF CPU 800 starts the accumulation operation of the focus detection sensor 901.

In step S501, the AF CPU 800 determines the accumulation mode (type) of line sensor #1 from the set value of the register mode. When the register mode is set to 0, the AF CPU 800 determines that the line sensor is of the first type. When the register mode is set to 1, the AF CPU 800 determines that the line sensor is of the second type. The AF CPU 800 controls to perform an accumulation operation corresponding to the type.

Control (steps S502 to S506) to perform the accumulation operation of the first type will be described first.

In step S502, the AF CPU 800 performs the initial reset operation of line sensor #1. The AF CPU 800 clears the register of its own to 0 and then outputs signals trans_1, rst, and rst_1 (sets the signal values to 1) to clear charges in the sensor unit 801 and the memory unit 803.

In step S503, the AF CPU 800 ends outputting the signals rst and rst_1 (changes the signal values to 0) to complete reset of the sensor unit 801 and the memory unit 803. An accumulation start operation is then executed. Since the AF CPU 800 outputs the signal trans_1 continuously from step S502, the transfer gate 802 is on. Signal charges generated by the sensor unit 801 during accumulation are accumulated in the memory unit 803 via the transfer gate 802 and converted into a voltage.

In step S504, the AF CPU 800 determines, based on the value of the signal comp output from the comparator 807, whether charge accumulation has sufficiently been done. If line sensor #1 has accumulated sufficient charges, and the charge accumulation should end, p-out>VR, and the comparator 807 outputs comp=1. If the value of the signal comp is 1 in step S504, the AF CPU 800 executes accumulation end processing from step S505. On the other hand, if comp=0 is output, p-out≤VR (charge accumulation is insufficient). Hence, the AF CPU 800 continues the determination processing of step S504 until signal comp=1.

In step S505, the AF CPU 800 ends output of the signal trans_1 to turn off the transfer gate 802. Accumulated charges integrated by the memory unit 803 of line sensor #1 are stored in the memory unit 803.

In step S506, the AF CPU 800 sets 1 to a register tr_1 representing an accumulation end flag, thereby ending the accumulation operation. Monitoring the register tr_1 by communication from outside (for example, camera CPU 100) allows to know the end of accumulation in line sensor #1.

Control (steps S507 to S512) to perform the accumulation operation of the second type will be described next.

In step S507, the AF CPU 800 performs the initial reset operation of line sensor #1. The AF CPU 800 clears the register of its own to 0 and then outputs the signals trans_1, rst, and rst_1 (sets the signal values to 1) to clear charges in the sensor unit 801 and the memory unit 803.

In step S508, the AF CPU 800 ends outputting the signals trans_1 and rst (changes the signal values to 0). Reset of the sensor unit 801 is thus completed, and accumulated charges generated by the sensor unit 801 are accumulated in the sensor unit 801. Since the AF CPU 800 ends outputting the signal trans_1, the transfer gate 802 is turned off. In addition, output of the signal rst_1 is continued. For these reasons, the memory unit 803 is continuously reset even during the charge accumulation period.

In step S509, the AF CPU 800 determines the value of a register stp of its own. In the accumulation operation of the second type, the memory unit 803 is being reset even during the charge accumulation period. For this reason, p-out>VR does not hold, and the accumulation stop cannot be determined based on the signal comp. In this case, the value of the register stp of the AF CPU 800 is set by communication with the AF CPU 800 from outside (for example, camera CPU 100), thereby externally controlling the end of the accumulation operation. If the value of the register stp is 1, the AF CPU 800 determines to end accumulation, and advances to processing from step S110. If the value of the register stp is 0, the AF CPU 800 continuously executes determining the value of the register stp in step S509.

In step S510, the AF CPU 800 ends output of the signal rst_1 to complete reset of the memory unit 803. After that, the AF CPU 800 starts outputting the signal trans_1 to turn on the transfer gate 802 and thus transfer the accumulated charges integrated by the sensor unit 801 of line sensor #1 to the memory unit 803. Charge transfer from the sensor unit 801 to the memory unit 803 is not performed during the charge accumulation period. The memory unit 803 is continuously reset from the end of accumulation to a timing immediately before the accumulated charges are transferred. For this reason, noise generated in the memory unit 803 during the charge accumulation period is not accumulated in the memory unit 803.

In step S511, the AF CPU 800 cancels output of the signal trans_1 to turn off the transfer gate 802. The charges transferred in step S510 are thus stored in the memory unit 803.

In step S512, the AF CPU 800 sets 1 to the register tr_1 representing an accumulation end flag in the AF CPU.

As described above, the focus detection sensor according to this embodiment can switch the accumulation operation of a line sensor between the first type and the second type by setting the value of the register mode in the AF CPU 800 by communication from outside (for example, camera CPU 100).

Only the accumulation operation of line sensor #1 has been described above with reference to the flowchart of FIG. 14. The same accumulation operation is performed for line sensors #2 to #8 as well. The AF CPU 800 includes registers tr_2 to tr_8 for line sensors #2 to #8. The signal lines are also provided for line sensors #2 to #8.

(Operation of Camera)

Figure 15:
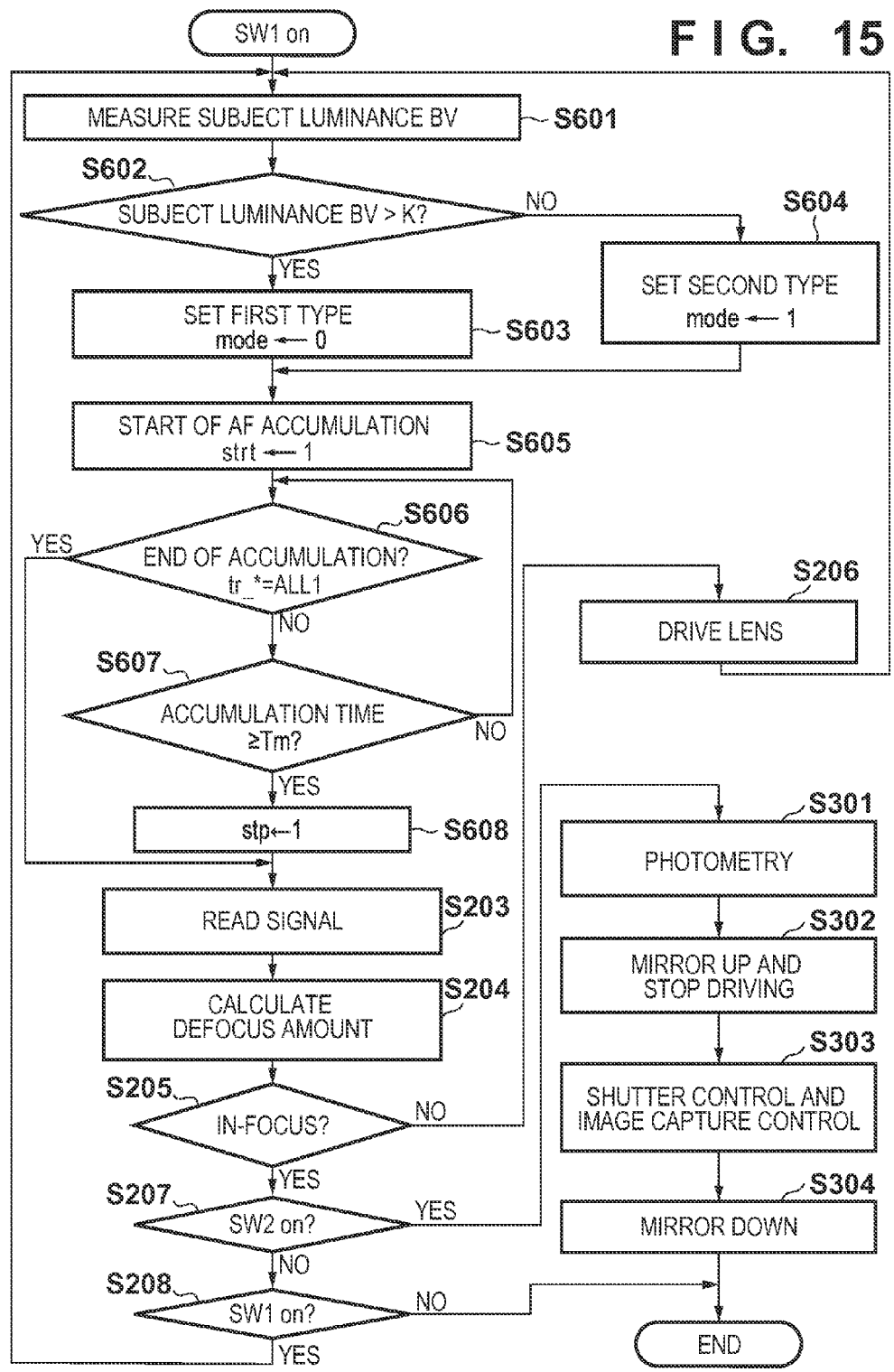
FIG. 15 is a flowchart for explaining an example of the operation of a camera including the focus detection sensor according to the fourth embodiment of the present invention.

An example of the operation of the camera including the above-described focus detection sensor 901 will be described in details with reference to the flowchart of FIG. 15. This operation is executed by the camera CPU 100 when the switch SW1 of the camera shown in FIG. 2 is turned on. Note that the same step numbers as in FIG. 6 denote the same operation steps in the flowchart of FIG. 15, and a description thereof will be omitted.

In step S601, the camera CPU 100 obtains a subject luminance BV from the photometric value detected by a photometric sensor 106.

In step S602, the camera CPU 100 determines whether subject luminance BV>K (K is a threshold). If subject luminance BV>K, in step S603, the camera CPU 100 sets 0 to the register mode of the AF CPU 800 so as to set line sensors #1 to #8 to the first type. On the other hand, if subject luminance BV≤K, in step S605, the camera CPU 100 sets 1 to the register mode of the AF CPU 800 so as to set line sensors #1 to #8 to the second type.

Figure 16:
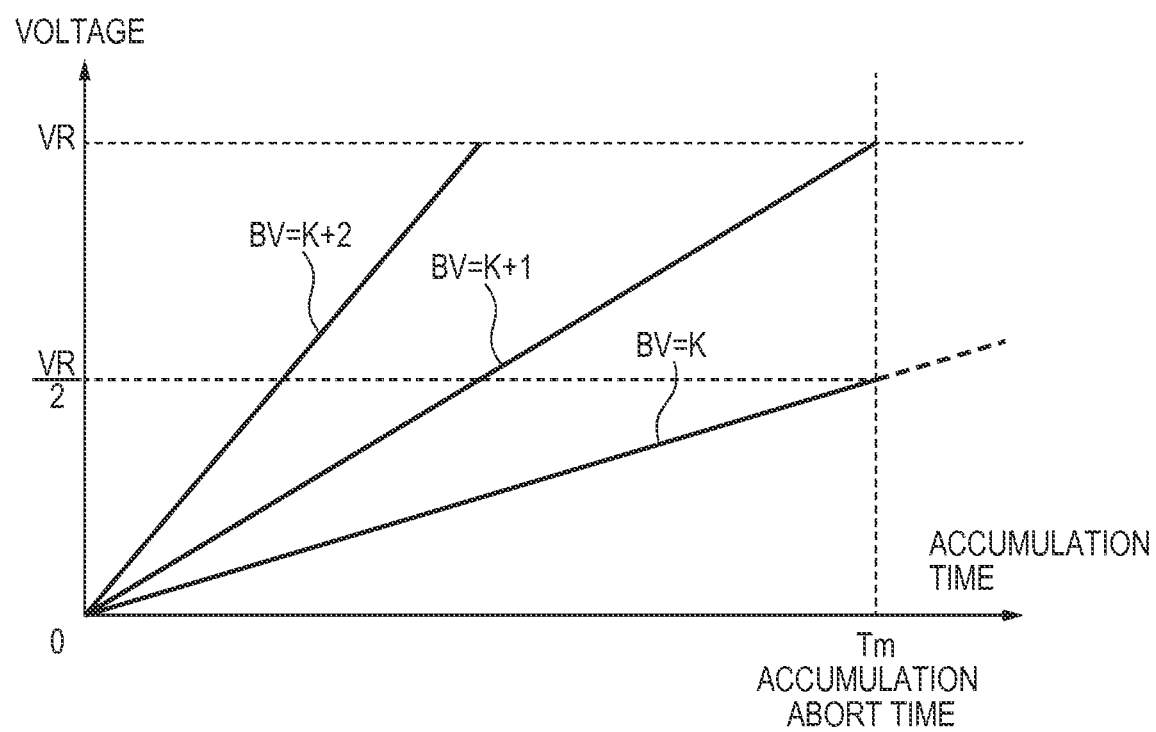
FIG. 16 is a graph showing the relationship between a charge accumulation time and a signal amount in the focus detection sensor according to the fourth embodiment of the present invention.

The threshold K (APEX) of luminance to decide the type of line sensor #1 will be described with reference to FIG. 16. FIG. 16 is a graph showing the relationship between the accumulation time and a signal amount (voltage) obtained in a line sensor. If the subject luminance BV is constant, the voltage output from the line sensor increases in proportion to the accumulation time. As described above with reference to FIG. 13, the AF CPU 800 continues accumulation until the output voltage of the line sensor exceeds a pixel saturation voltage VR. The accumulation time depends on the subject luminance BV. If the subject luminance BV is low, the accumulation time becomes long. When the accumulation time is long, the AF accuracy may degrade because of the influence of subject blur that occurs during charge accumulation. To prevent this, an accumulation abort time Tm is set. Even if the output voltage is equal to or lower than the pixel saturation voltage VR, the accumulation operation of the line sensor can forcibly be ended by communication from the camera CPU 100 when the time Tm has elapsed from the accumulation start.

The subject luminance at which the output voltage value reaches VR at the accumulation abort time Tm is defined as BV(APEX)=K+1. At subject luminance BV(APEX)=K, which is lower than (K+1) by one step (×½), the accumulation abort time Tm is reached before the output voltage reaches VR, and the accumulation is forcibly ended by setting 1 to the value of the register stp by communication from the camera CPU 100. Since the output voltage at the time of abort is VR/2, the influence of noise on the pixel signals of the line sensor cannot be neglected, and the S/N ratio degrades at a high possibility. To prevent this, in this embodiment, when subject luminance BV≤K (when the subject luminance is equal to or less than the threshold), the line sensor is set to the second type (mode=1) with little noise.

On the other hand, when subject luminance BV>K, an output voltage of VR/2 or more is obtained, and the influence of noise on the pixel signals is not large at a high possibility. In addition, accumulation control based on the output comp from the comparator 807 in the line sensor is needed so as not to make the output voltage exceed the pixel saturation voltage VR. Hence, the line sensor is set to the first type (mode=0).

Referring back to FIG. 15, in step S605, the camera CPU 100 communicates with the AF CPU 800 of the focus detection sensor 901, and sets 1 to a register strt of the AF CPU 800, thereby starting the AF accumulation operation. The focus detection sensor 901 thus starts the accumulation operation described with reference to FIG. 14 for line sensors #1 to #8. In addition, the camera CPU 100 starts counting an accumulation time T by an internal counter (not shown).

In step S606, the camera CPU 100 determines, based on the values of the registers tr_1 to tr_8 of the AF CPU 800, whether the accumulation operation of the focus detection sensor 901 has ended. If all the registers tr_1 to tr_8 have a value "1", accumulation has ended for all of line sensors #1 to #8. Hence, the camera CPU 100 performs a signal read operation in step S203. If at least one of the registers tr_1 to tr_8 has a value "0", the camera CPU 100 determines that a line sensor that has not ended accumulation remains, and advances to step S607.

In step S607, the camera CPU 100 determines the accumulation time T by the counter of its own. If accumulation time T≥Tm, accumulation of the focus detection sensor 901 has reached the abort time Tm, and the process advances to step S608. On the other hand, if accumulation time T<Tm, the process returns to step S606 to continue the accumulation operation.

In step S608, the camera CPU communicates with the AF CPU 800 to set 1 to the register stp of the AF CPU 800, thereby ending accumulation for all of line sensors #1 to #8.

Figure 7:
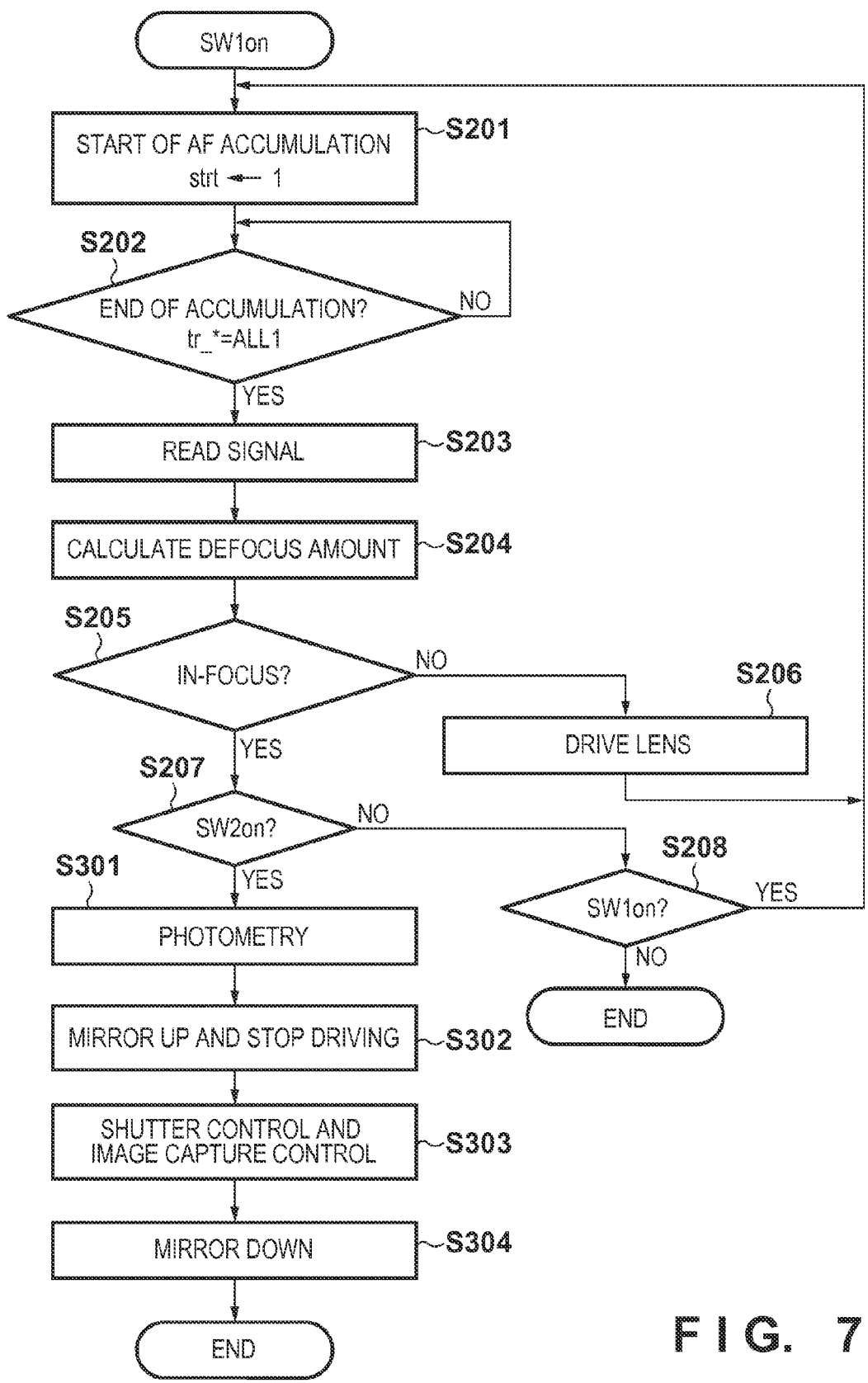
FIG. 7 is a flowchart for explaining an example of the operation of the camera including the focus detection sensor according to the first embodiment of the present invention.

The operations of steps S203 to S206 and steps S301 to S304 are the same as those represented by the same step numbers in FIG. 7 described in the first embodiment, and a description thereof will be omitted here.

In this embodiment, the camera CPU 100 measures the subject luminance BV using the photometric sensor 106. However, the present invention is not limited to this. For example, line sensors #1 to #8 of the focus detection sensor 901 may temporarily be set to the first type, and the subject luminance BV may be measured based on the charge accumulation times or output signal amounts of line sensors #1 to #8.

As described above, in this embodiment, the operation type of a line sensor can dynamically be set. When the subject luminance is less than the threshold, the line sensor is set to the second type. When the subject luminance is equal to or more than the threshold, the line sensor is set to the first type. This allows to suppress degradation of the S/N ratio of a pixel signal especially when the subject luminance is low.

In this embodiment, a case has been described in which all line sensors are set to one of the first type and the second type in accordance with the subject luminance. However, a focus detection sensor having the arrangement shown in FIG. 13 can be used even when an operation type corresponding to a line sensor is set, as described above in the first embodiment. In this case, since the two types can be used at the same position, focus detection can be performed more flexibly.

Other Embodiments

In the above embodiments, an example in which the focus detection sensor is used for automatic focus detection of an image capture apparatus has been described. However, the focus detection sensor can also suitably be used for automatic focus detection in an arbitrary optical apparatus having no image capture function, for example, a telescope or a projector.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-174251, filed on Aug. 9, 2011, and No. 2011-271690, filed on Dec. 12, 2011, which are hereby incorporated by reference herein their entirety.

What is claimed is:

1. An apparatus which includes a defocus amount detection unit using a signal, comprising:
   a sensor having photoelectric conversion portions and charging portions, the charging portions being configured to integrate, for each of the photoelectric conversion portions, charges transferred from the photoelectric conversion portions, wherein the sensor is configured to output the signal for detecting a defocus amount; and
   a controller configured to control an accumulation operation of the sensor by switching between an accumulation operation of a first type and an accumulation operation of a second type,
   wherein the accumulation operation of the first type is configured to be able to monitor an amount of accumulated charges during a charge accumulation period based on charges integrated by the charging portions and the accumulation operation of the second type is configured to be unable to monitor the amount of the accumulated charges during the charge accumulation period based on the charges integrated by the charging portions.

2. The apparatus according to claim 1, wherein the signal output from the sensor corresponds to integrated charges in the charging portions.

3. The apparatus according to claim 2, wherein the charging portions are not reset during the charge accumulation period in the accumulation operation of the first type, and the charging portions are reset during the charge accumulation period in the accumulation operation of the second type.

4. The apparatus according to claim 3, wherein the charging portions are reset during a period that starts after the charge accumulation period in the accumulation operation of the second type starts and ends before transfers of the charges from the photoelectric conversion portions to the charging portions is started.

5. The apparatus according to claim 1, wherein the controller is configured to be able to switch electrically from the accumulation operation of the first type to the accumulation operation of the second type.

6. The apparatus according to claim 1, wherein the controller is configured to be able to switch electrically from the accumulation operation of the second type to the accumulation operation of the first type.

7. An optical apparatus comprising:
   the apparatus according to claim 1; and
   a lens driving unit configured to drive imaging lens based on the defocus amount detected by the defocus amount detection unit.

* * * * *